United States Patent
Fujii et al.

(10) Patent No.: US 10,715,666 B2
(45) Date of Patent: Jul. 14, 2020

(54) COMMUNICATION TERMINAL, COMMUNICATION SYSTEM, COMMUNICATION MANAGEMENT METHOD, AND MEDIUM

(71) Applicants: Atsuhiro Fujii, Kanagawa (JP); Takeshi Fujita, Tokyo (JP); Yoshinaga Kato, Kanagawa (JP); Kiyoshi Kasatani, Kanagawa (JP)

(72) Inventors: Atsuhiro Fujii, Kanagawa (JP); Takeshi Fujita, Tokyo (JP); Yoshinaga Kato, Kanagawa (JP); Kiyoshi Kasatani, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 254 days.

(21) Appl. No.: 15/746,936

(22) PCT Filed: May 16, 2016

(86) PCT No.: PCT/JP2016/002382
§ 371 (c)(1),
(2) Date: Jan. 23, 2018

(87) PCT Pub. No.: WO2017/017872
PCT Pub. Date: Feb. 2, 2017

(65) Prior Publication Data
US 2020/0045176 A1    Feb. 6, 2020

(30) Foreign Application Priority Data

Jul. 29, 2015   (JP) .................................. 2015-149155

(51) Int. Cl.
*H04M 3/51* (2006.01)
*H04M 3/56* (2006.01)
(Continued)

(52) U.S. Cl.
CPC ......... *H04M 3/5191* (2013.01); *H04M 3/563* (2013.01); *H04W 4/08* (2013.01); *H04W 28/0215* (2013.01)

(58) Field of Classification Search
CPC .. H04M 3/5191; H04M 3/563; H04M 3/5232; H04M 3/5233; H04W 4/08
(Continued)

(56) References Cited

U.S. PATENT DOCUMENTS 5,771,280 A    6/1998  Johnson
8,850,033 B2   9/2014  Umehara et al.
(Continued)

FOREIGN PATENT DOCUMENTS

EP    2 822 253 A1    1/2015
JP    H09-186760      7/1997
(Continued)

OTHER PUBLICATIONS

International Search Report and Written Opinion dated Jun. 14, 2016 in PCT/JP2016/002382 filed on May 16, 2016.
(Continued)

*Primary Examiner* — Thjuan K Addy
(74) *Attorney, Agent, or Firm* — Oblon, McClelland, Maier & Neustadt, L.L.P.

(57) ABSTRACT

While using a communication system in which groups of destinations on a network are managed, and any one of the groups can be specified as a destination, if a group needs to be changed, added, or deleted, updating the system on the network is required, which increases load of maintenance. To address such a problem, an operation input receiving unit of a terminal receives selection of a group including destination information that represents destination candidates of communication. A destination management unit of the terminal determines a destination among the destination can-
(Continued)

didates represented by the destination information included in the selected group. A sending and receiving unit of the terminal makes a request for starting communication with the determined destination, to a management system.

11 Claims, 19 Drawing Sheets

(51) Int. Cl.
  *H04W 4/08* (2009.01)
  *H04M 3/42* (2006.01)
  *H04W 28/02* (2009.01)
(58) Field of Classification Search
  USPC ............ 379/204.01, 201.01, 265.11, 265.12, 379/265.04, 265.05
  See application file for complete search history.

(56) References Cited

U.S. PATENT DOCUMENTS

| | | | |
|---|---|---|---|
| 9,123,009 B1* | 9/2015 | Etter | ................ G06Q 10/06311 |
| 9,131,104 B2 | 9/2015 | Nakafuji et al. | |
| 2008/0263076 A1 | 10/2008 | Duffield et al. | |
| 2014/0177819 A1* | 6/2014 | Vymenets | ........... H04M 3/5183 379/265.09 |
| 2015/0006699 A1 | 1/2015 | Aono et al. | |

FOREIGN PATENT DOCUMENTS

| | | |
|---|---|---|
| JP | H11-136338 | 5/1999 |
| JP | 2008-205587 | 9/2008 |
| JP | 2012-191598 | 10/2012 |
| JP | 2014-200063 | 10/2014 |

OTHER PUBLICATIONS

Galaxy S5 Active SC-02G instruction manual, [online], NTT DOCOMO Inc., Sep. 2014, pp. 186-197, Retrieved from the Internet <URL: https://www.nttdocomo.co.jp/binary/pdf/support/trouble/manual/download/SC-02G_J_OP_01.pdf>.

Extended European Search Report dated Jun. 22, 2018 in Patent Application No. 16829981.6.

\* cited by examiner

[Fig. 1]
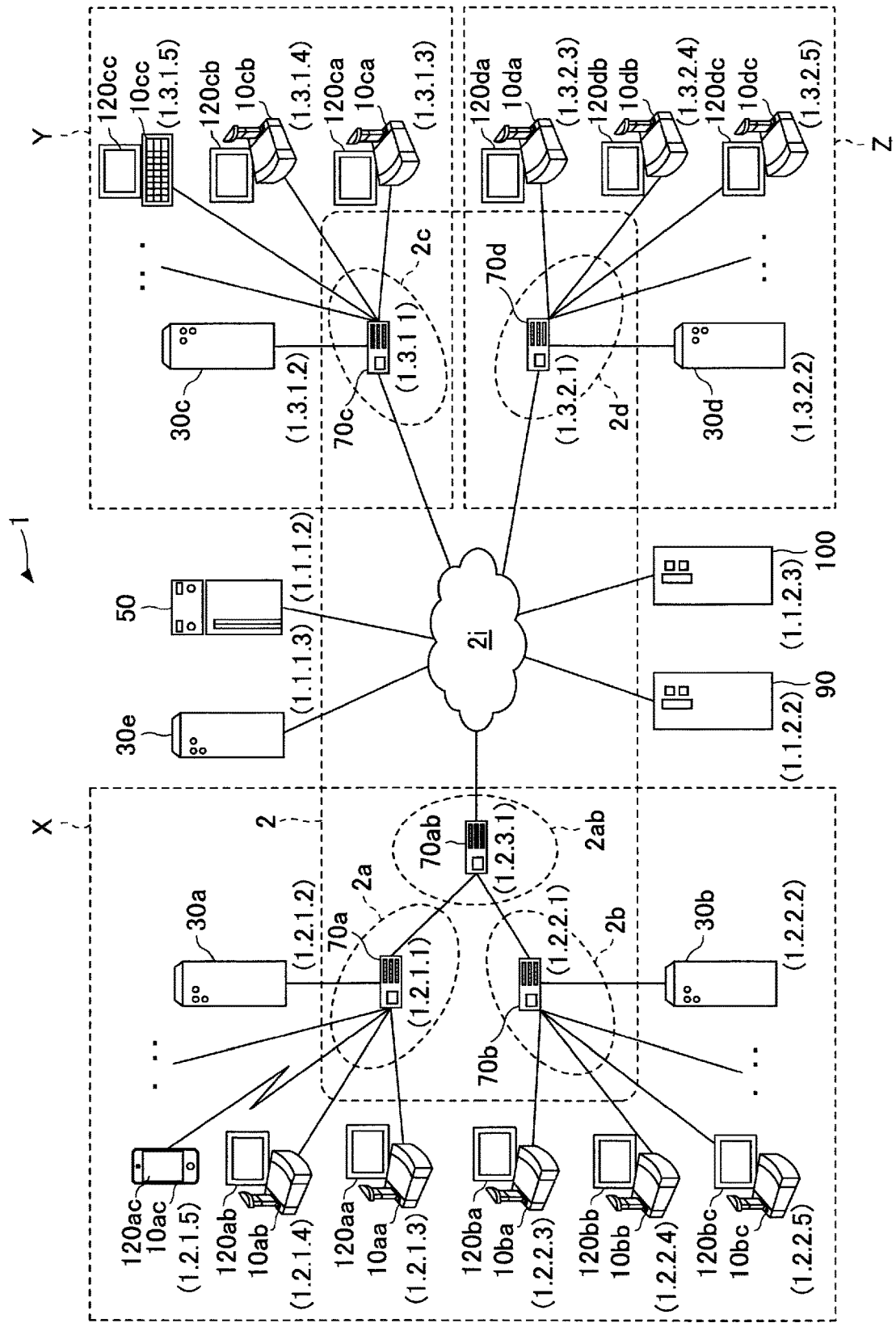

[Fig. 2]
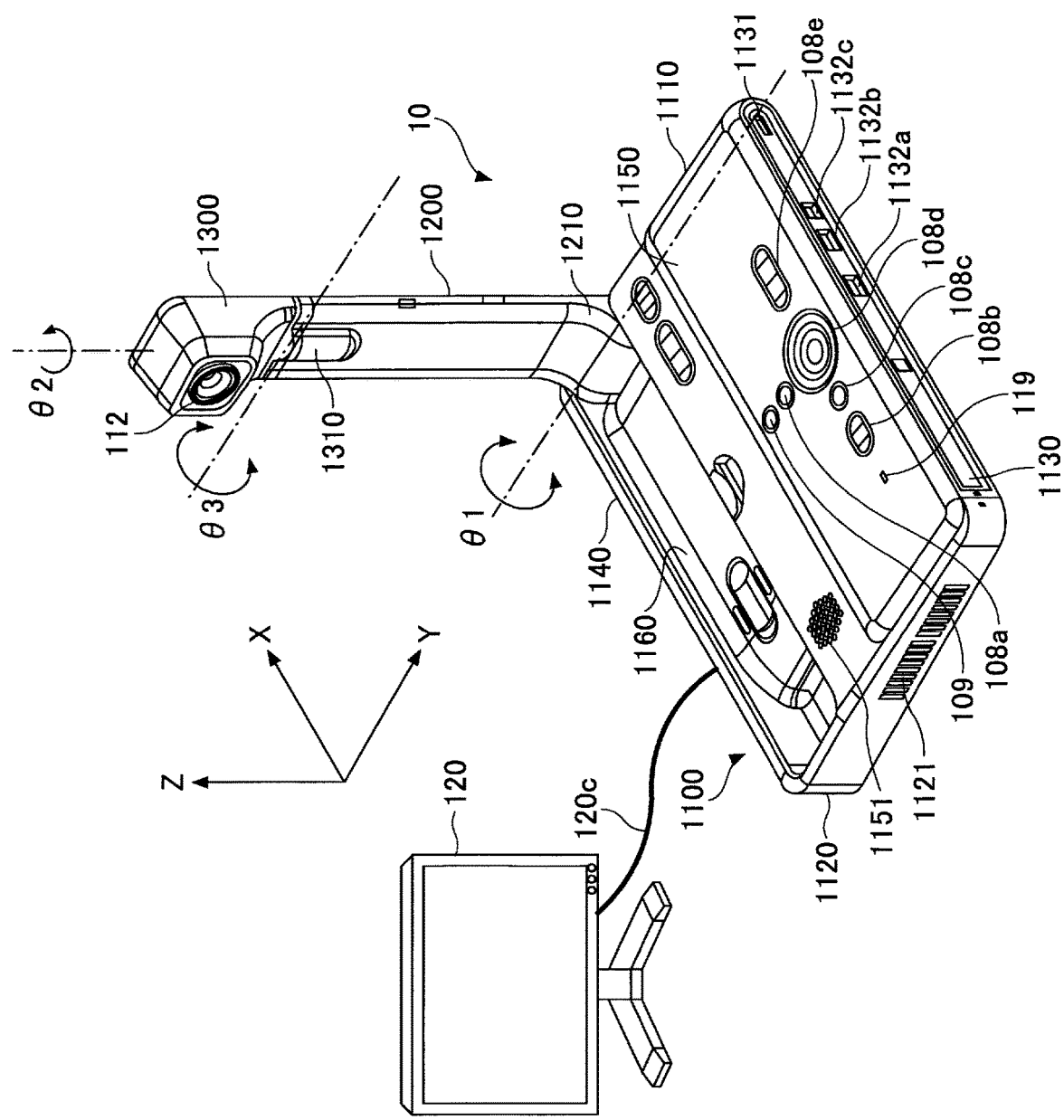

[Fig. 3]
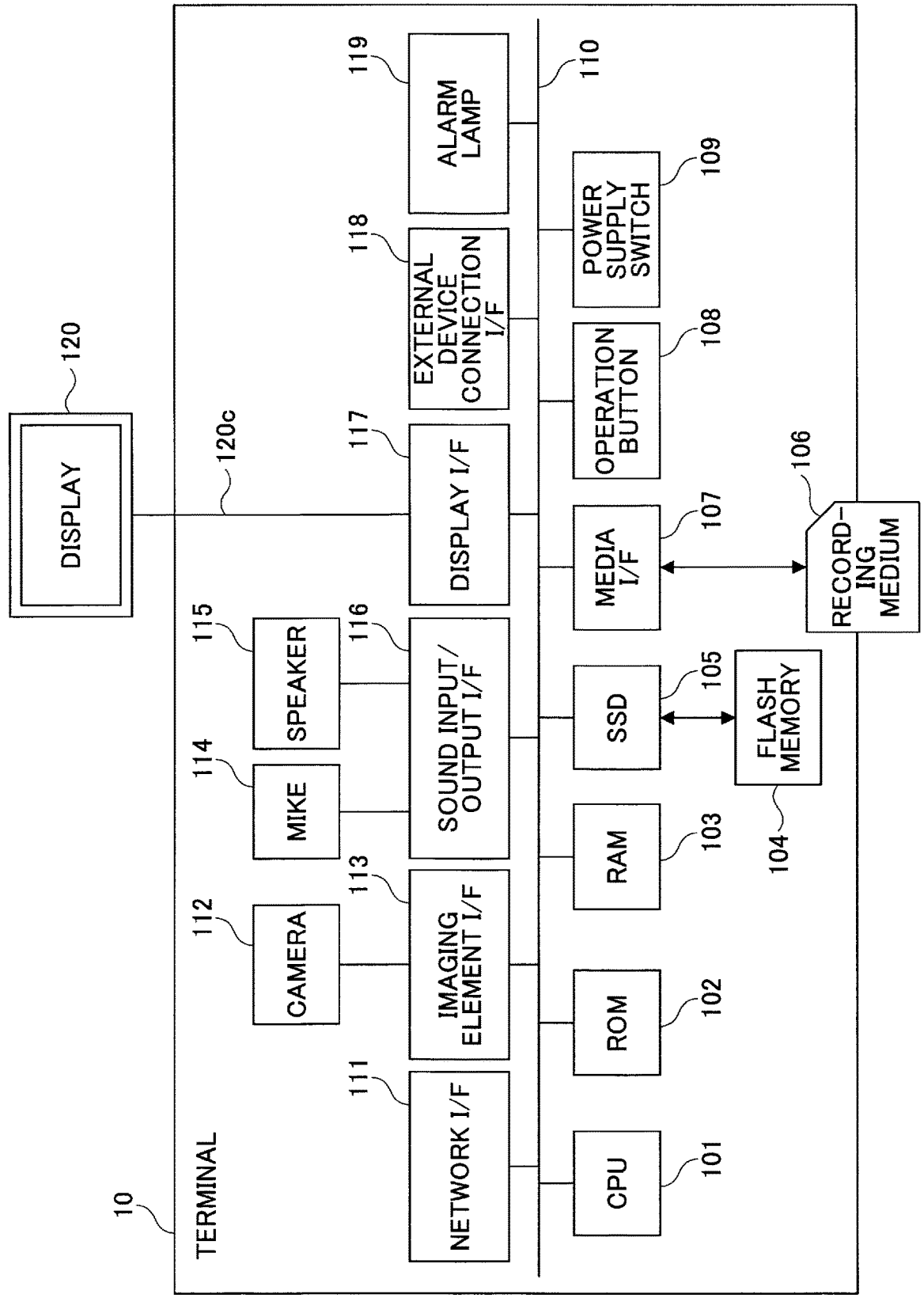

[Fig. 4]
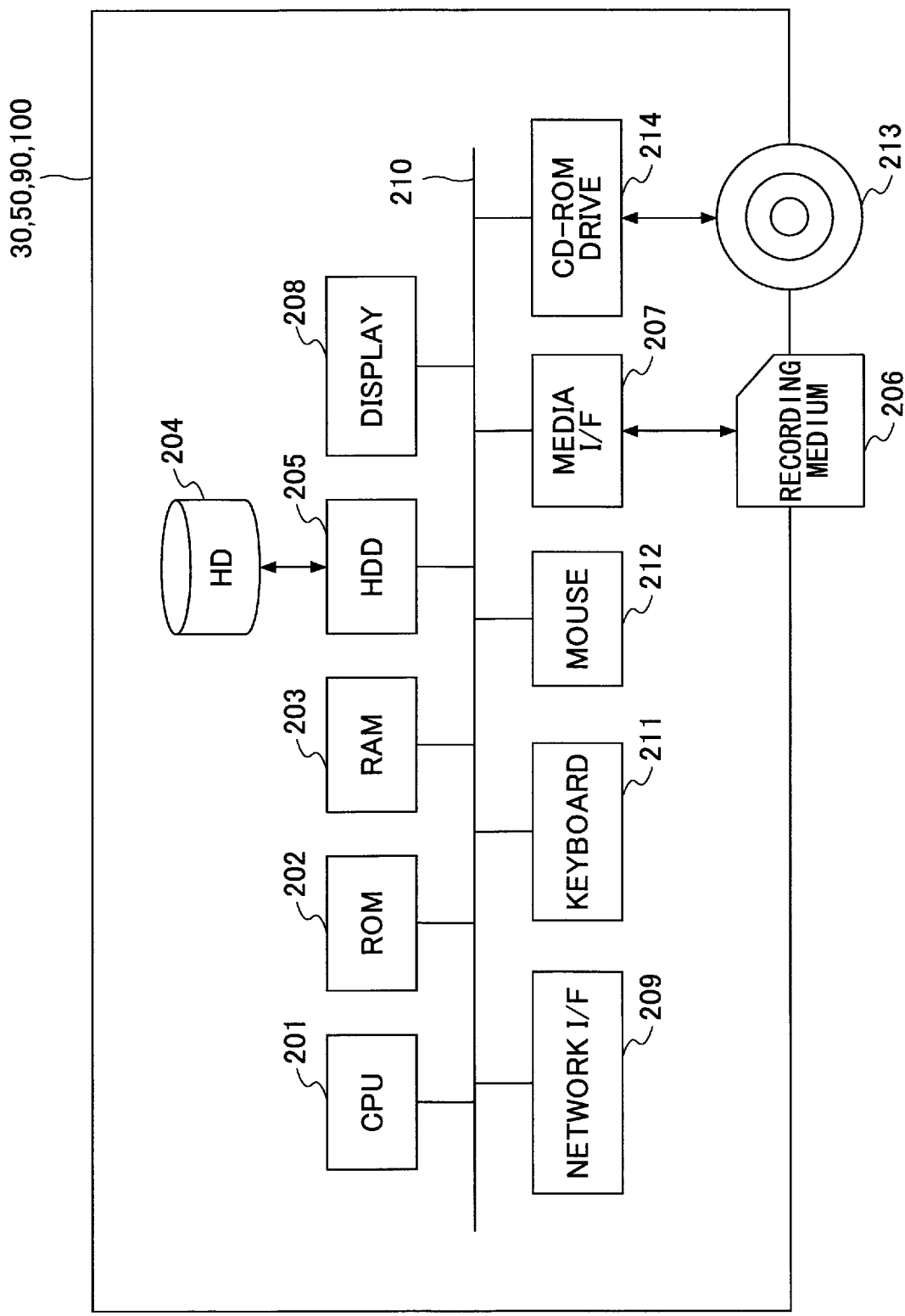

[Fig. 5]
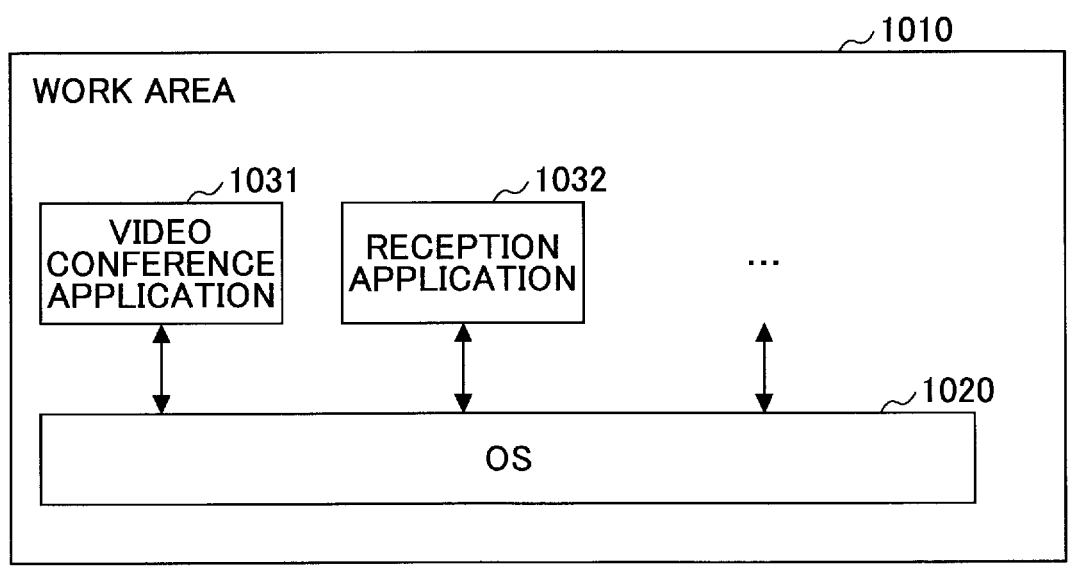

[Fig. 6]
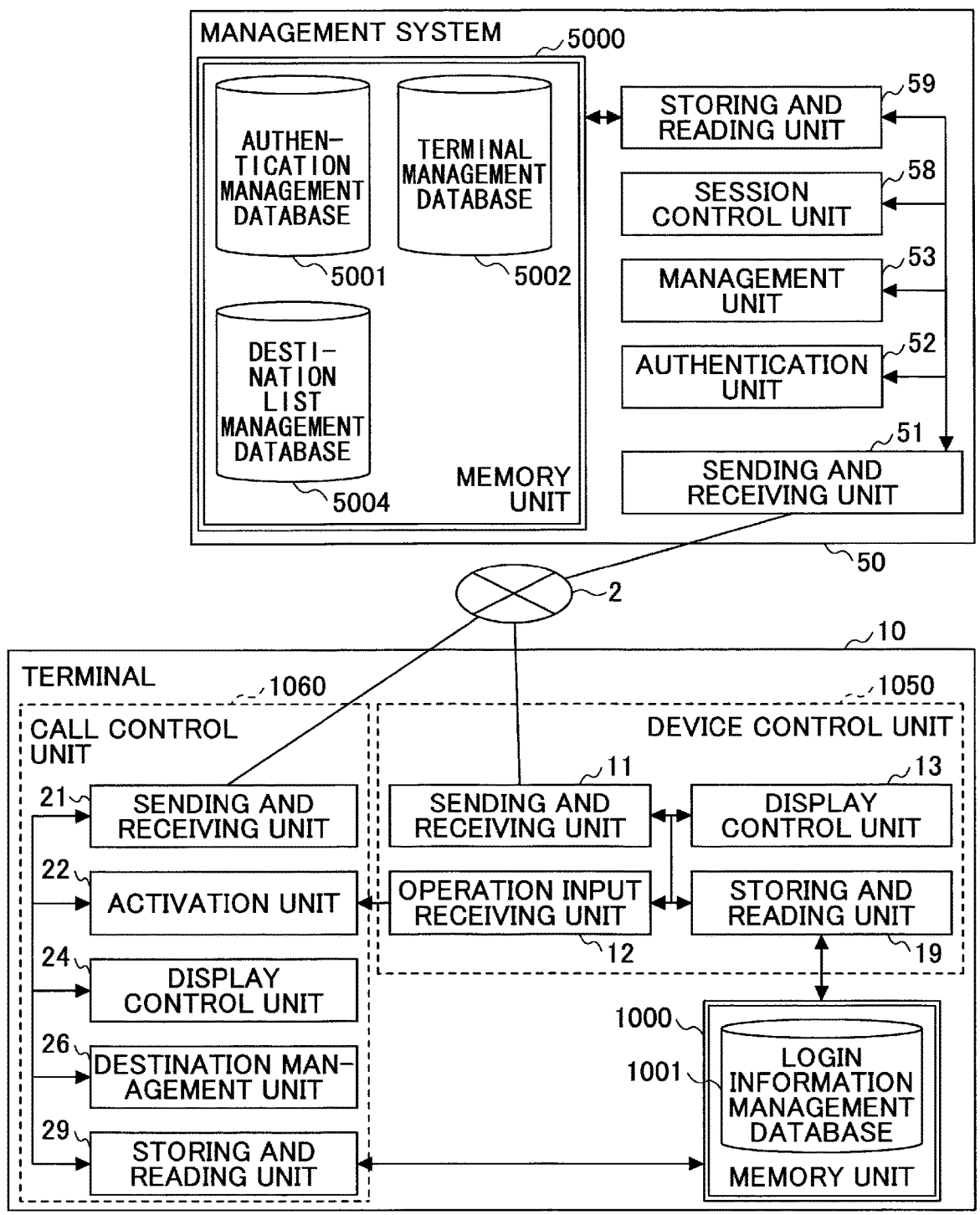

[Fig. 7A]

LOGIN INFORMATION MANAGEMENT TABLE

| INFORMATION FOR NARROWING | COMMUNICATION ID | PASSWORD |
|---|---|---|
| DOMESTIC TRAVEL | 01aa | aaaa |
| OVERSEAS TRAVEL | 02aa | abcd |

[Fig. 7B-1]

AUTHENTICATION MANAGEMENT TABLE

| COMMUNICATION ID | PASSWORD |
|---|---|
| 01aa | aaaa |
| 02aa | abcd |
| ... | ... |

[Fig. 7B-2]

TERMINAL MANAGEMENT TABLE

| COMMUNI-CATION ID | DESTINATION NAME | OPERATION STATE | IP ADDRESS OF TERMINAL |
|---|---|---|---|
| 01aa | BRANCH A, DOMESTIC TRAVEL | ONLINE (READY TO COMMUNICATE) | 1.2.1.3 |
| ... | ... | ... | ... |
| 02aa | BRANCH A, OVERSEAS TRAVEL | OFFLINE | |
| ... | ... | ... | ... |
| 01da | HOKKAIDO·TOHOKU 1 | ONLINE (COMMUNICATING) | 1.3.2.3 |
| 01db | HOKKAIDO·TOHOKU 2 | ONLINE (READY TO COMMUNICATE) | 1.3.2.4 |
| ... | ... | ... | ... |
| 01dm | KYUSHU·OKINAWA 1 | ONLINE (READY TO COMMUNICATE) | 1.3.2.... |
| 01dn | KYUSHU·OKINAWA 2 | ONLINE (READY TO COMMUNICATE) | 1.3.2.... |
| ... | ... | ... | ... |
| 01dx | EUROPE 1 | ONLINE (READY TO COMMUNICATE) | 1.3.2.... |
| 01dy | EUROPE 2 | ONLINE (COMMUNICATING) | 1.3.2.... |
| ... | ... | ... | ... |

[Fig. 7B-3]

DESTINATION LIST MANAGEMENT TABLE

| COMMUNICATION ID OF SOURCE OF START REQUEST | COMMUNICATION ID OF DESTINATION CANDIDATE |
|---|---|
| 01aa | 01da,01db,···01dm,01dn |
| 02aa | 01dx,01dy,··· |
| ... | ... |

[Fig. 8]
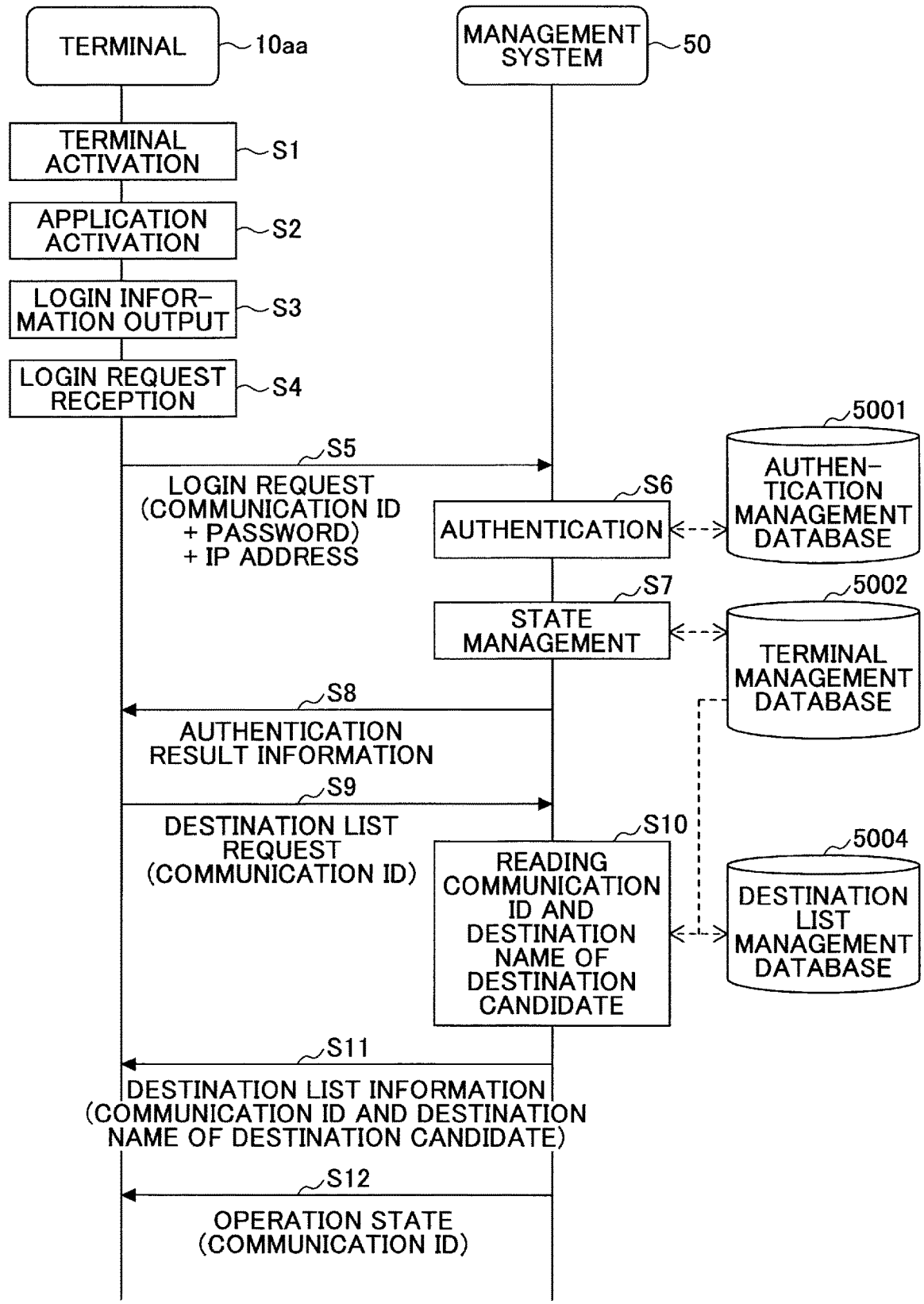

[Fig. 9A]
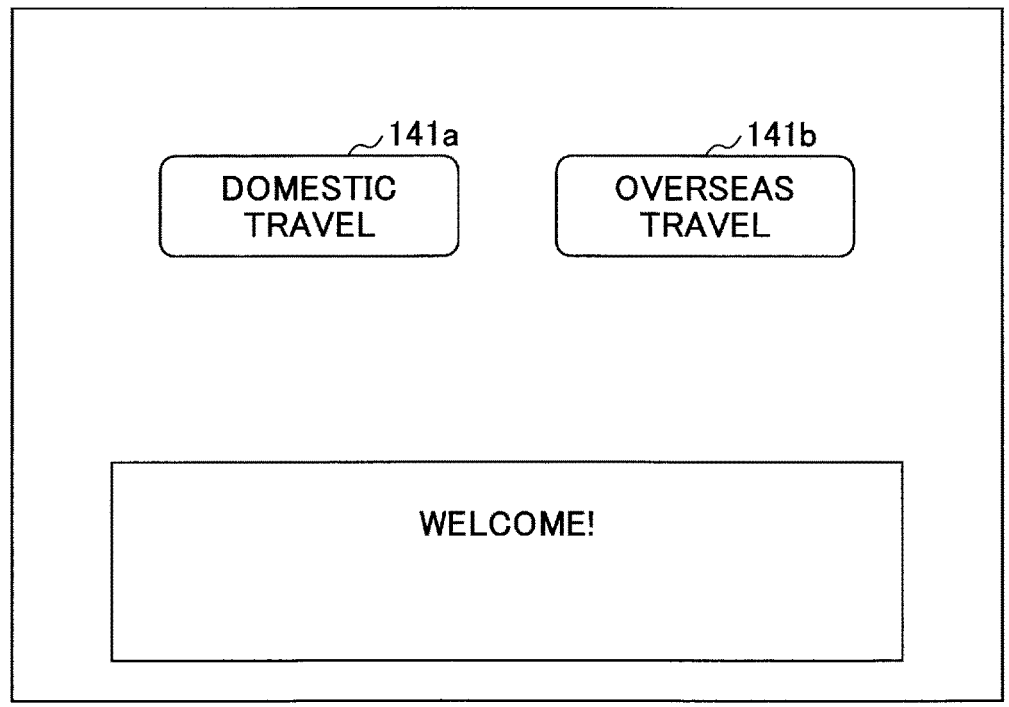
[Fig. 9B]
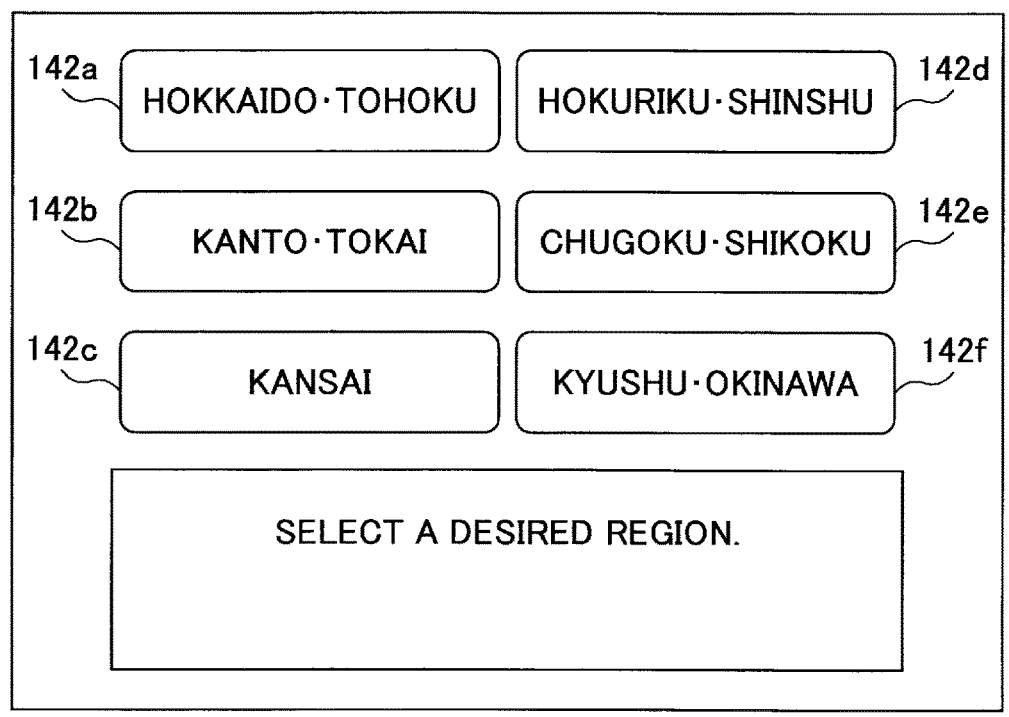

[Fig. 9C]
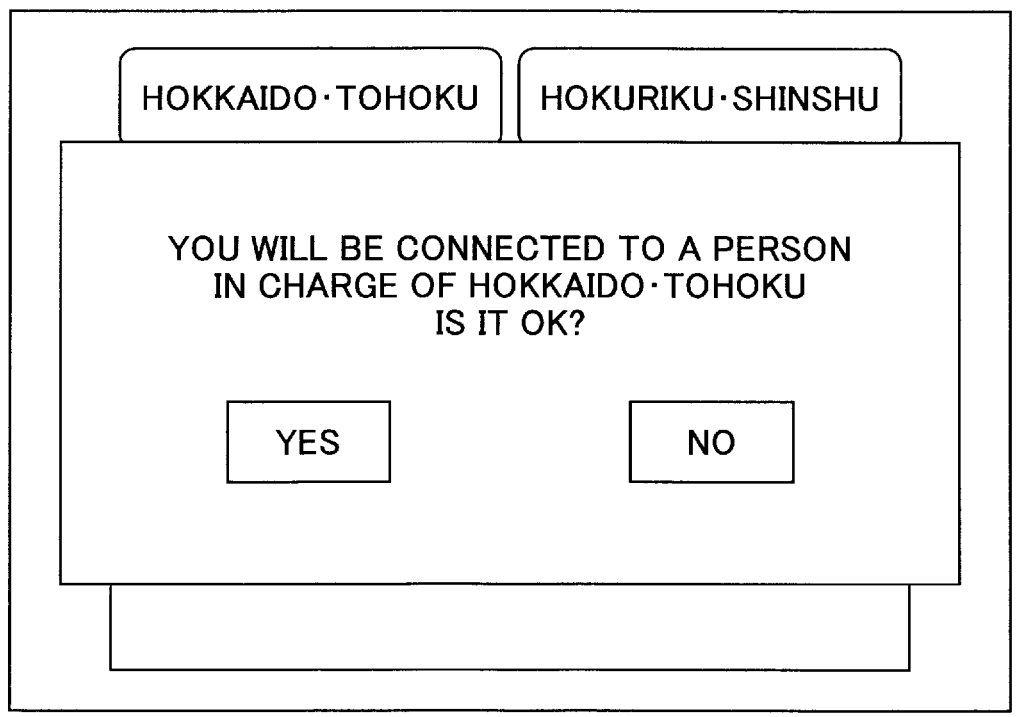

[Fig. 10]
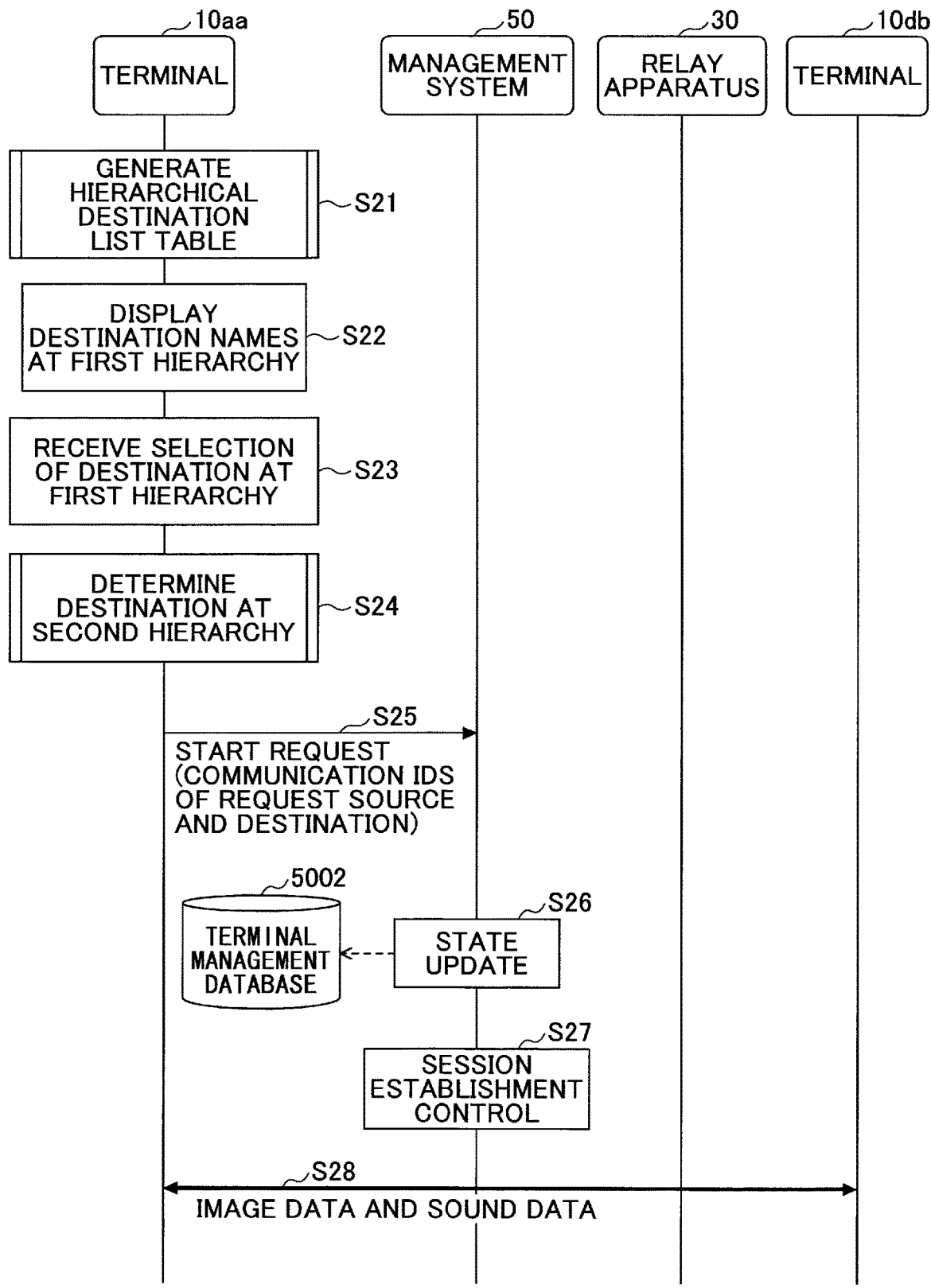

[Fig. 11]
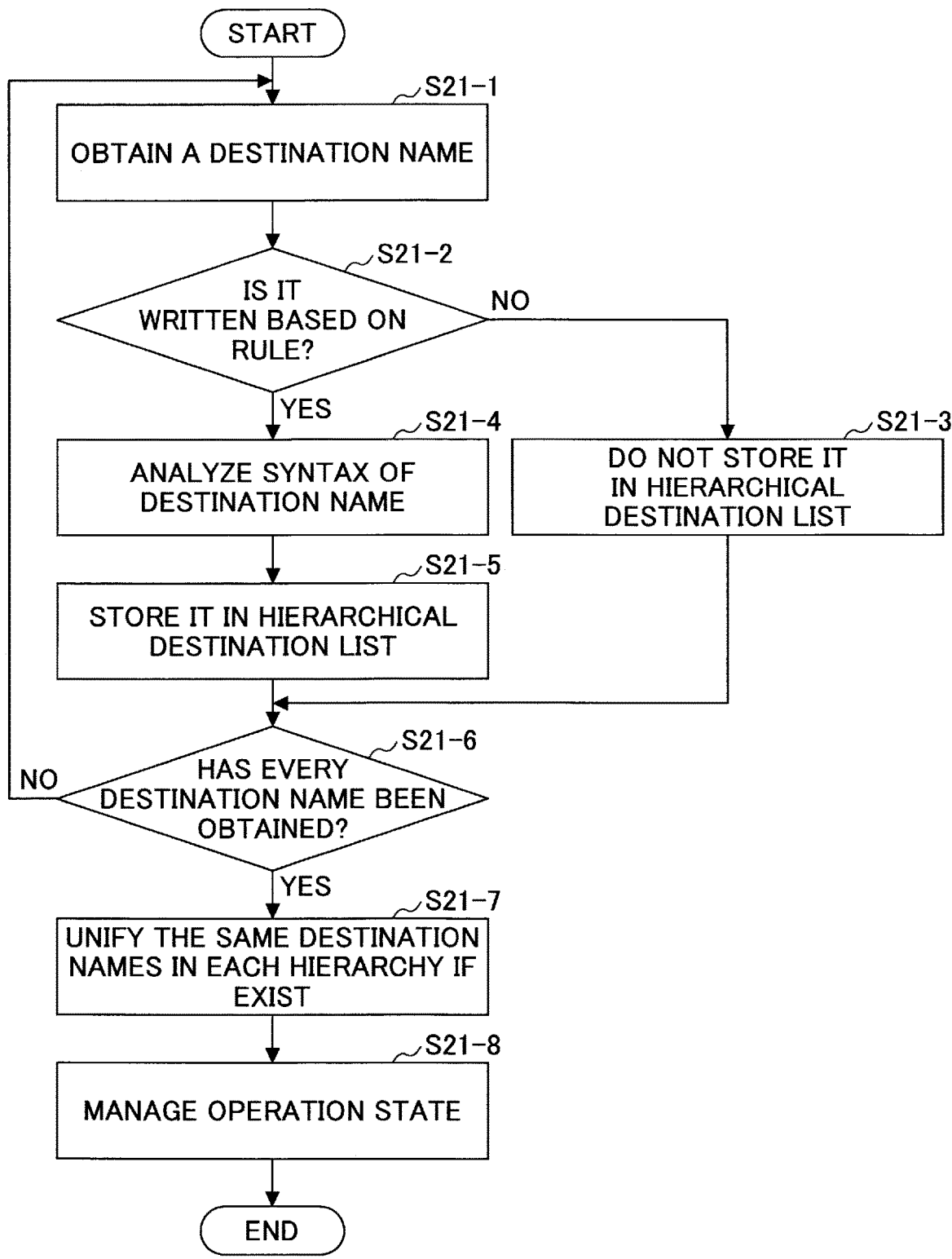

[Fig. 12]
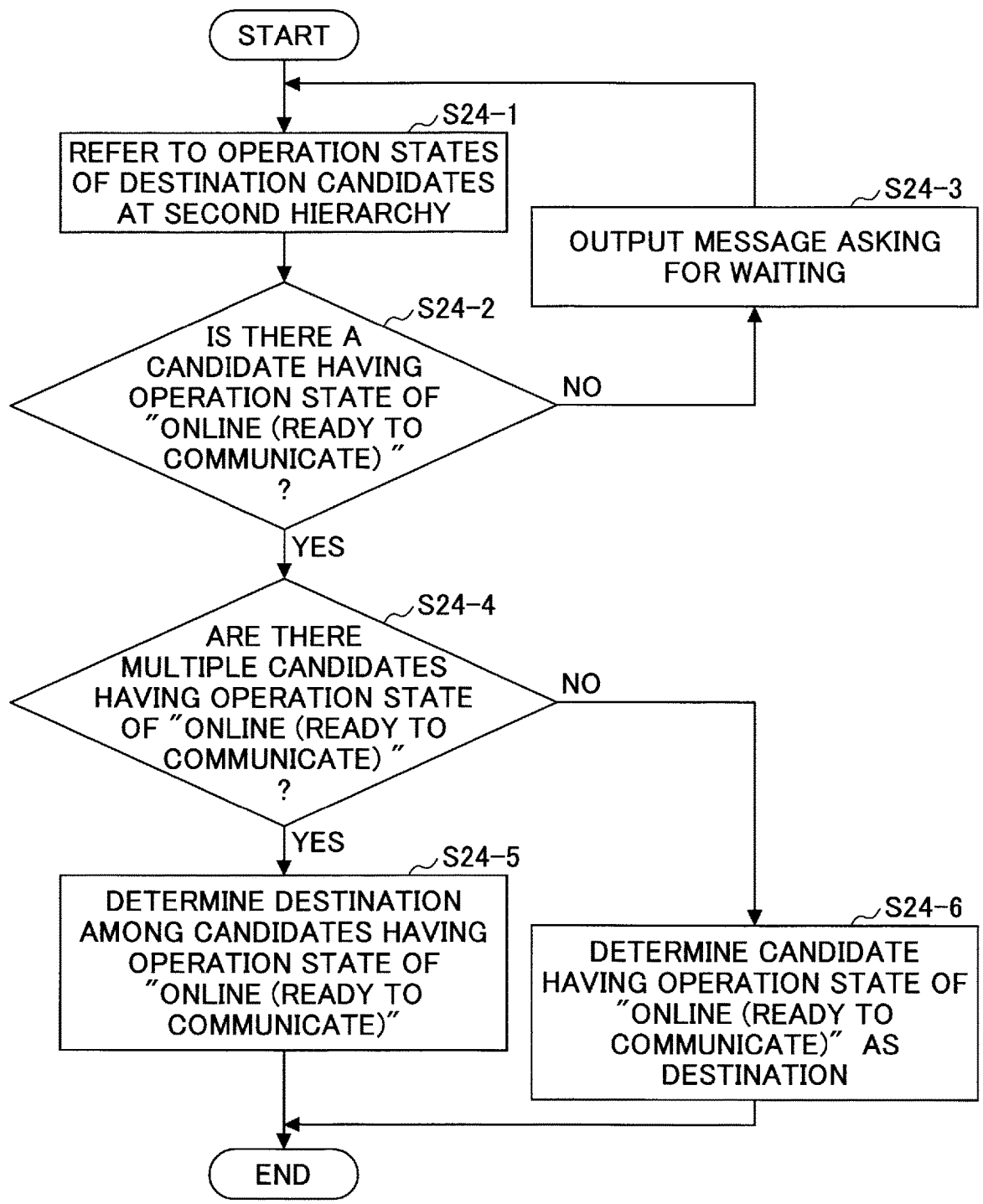

[Fig. 13]
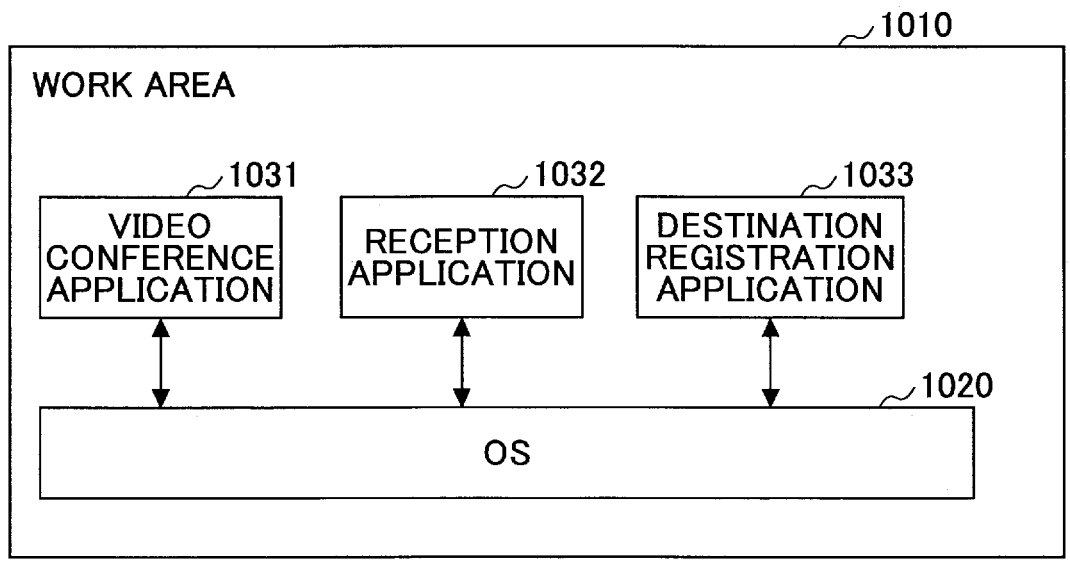
[Fig. 14A]
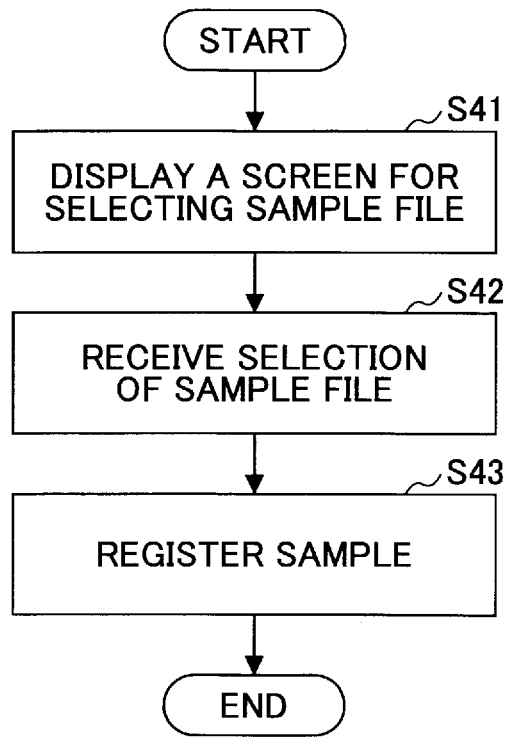

[Fig. 14B]
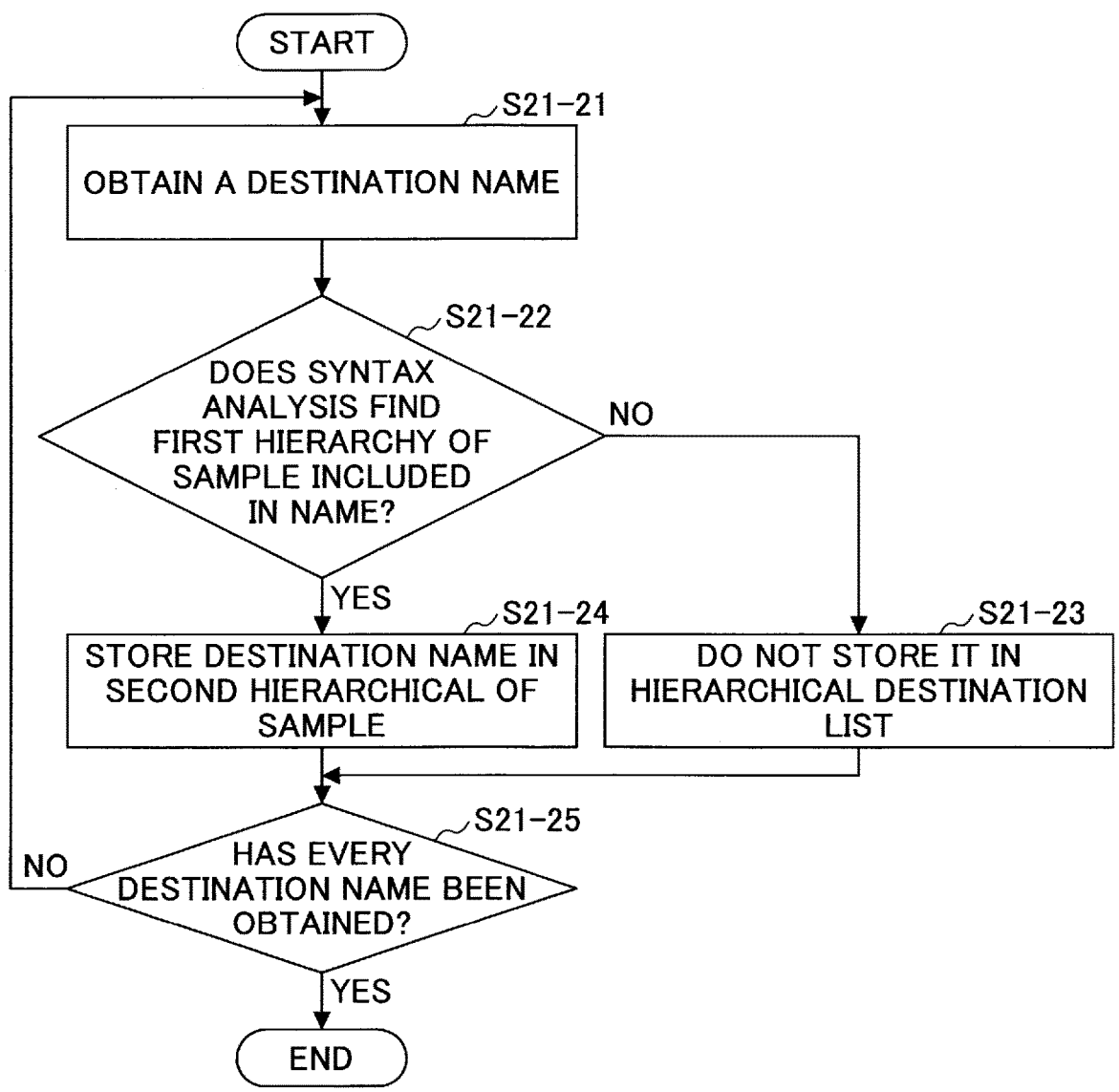

[Fig. 15A]
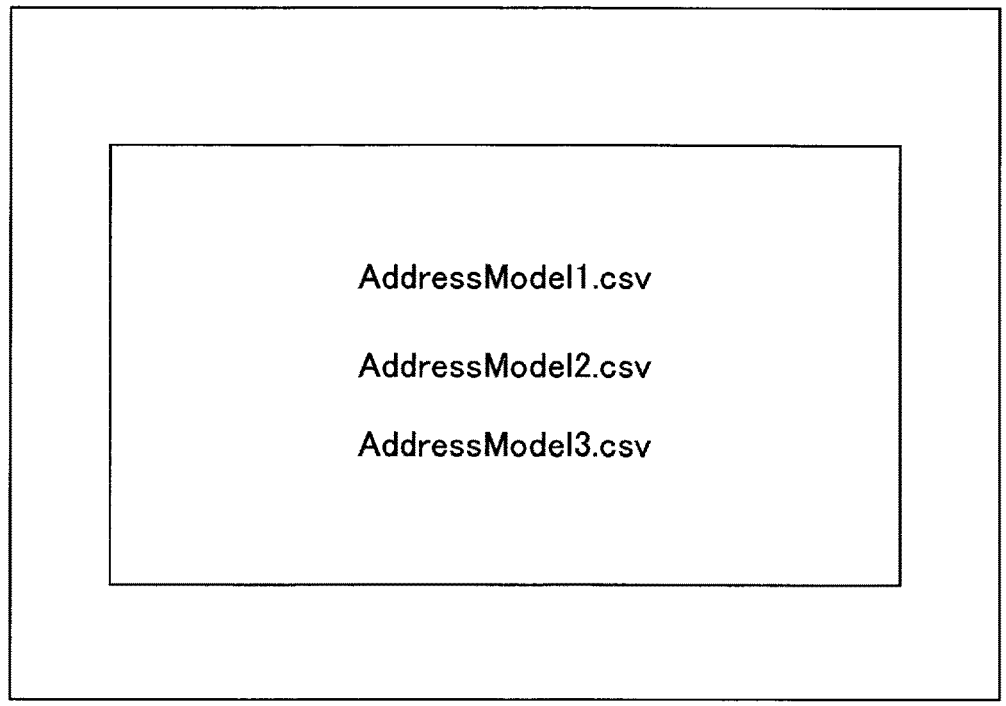
[Fig. 15B]
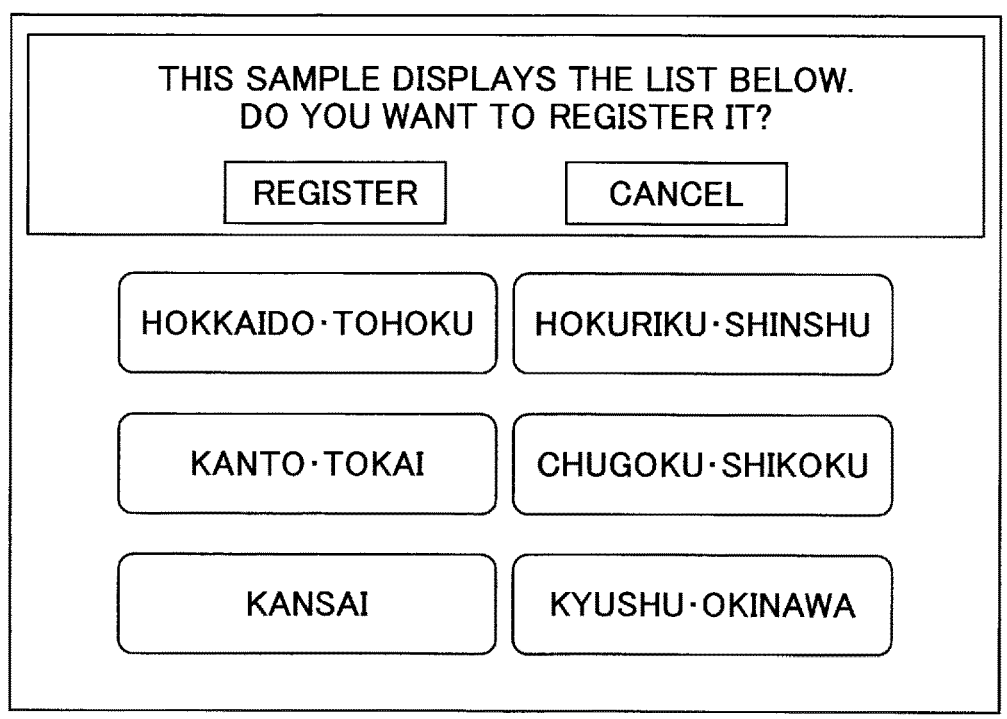

[Fig. 16]
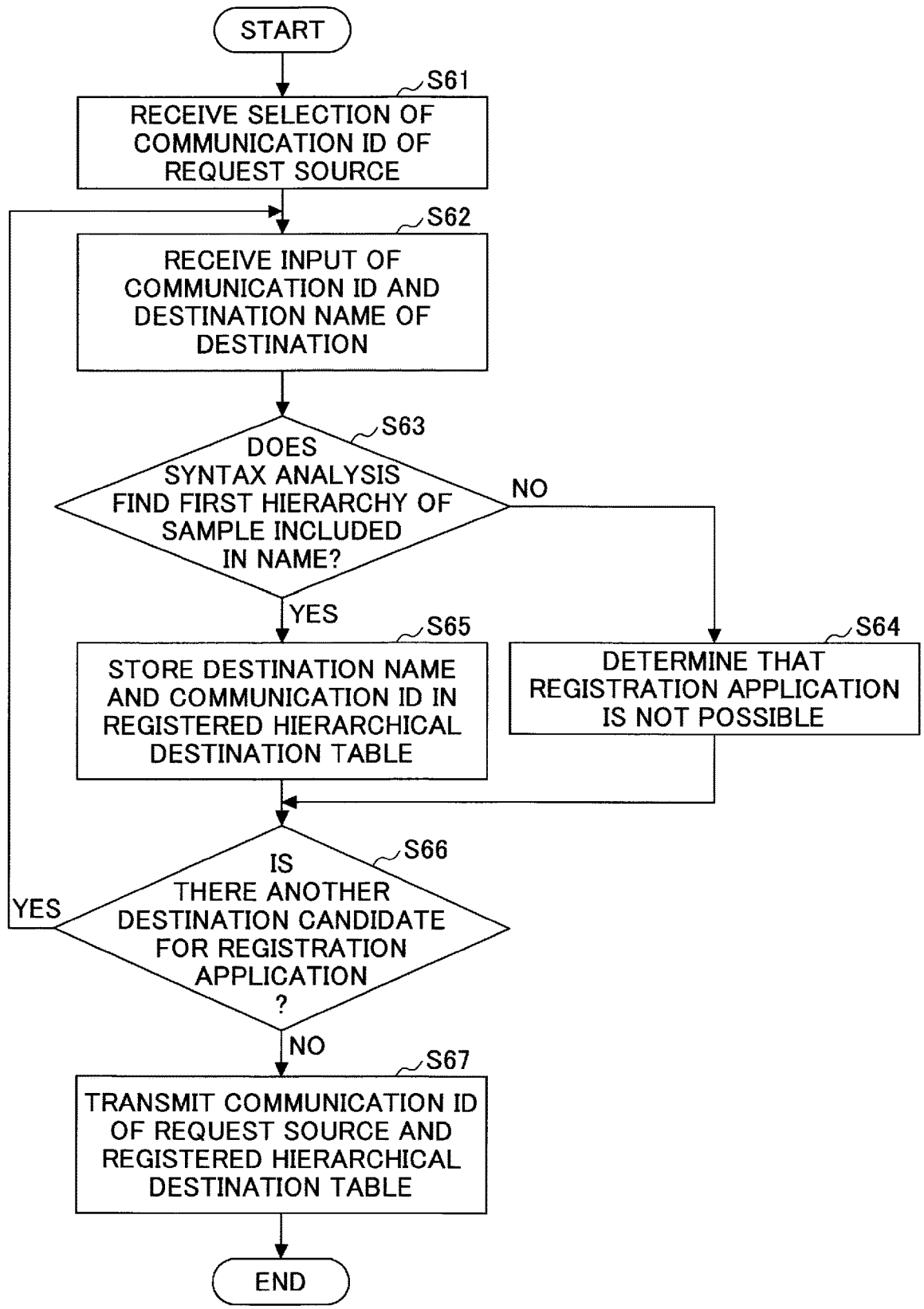

COMMUNICATION TERMINAL, COMMUNICATION SYSTEM, COMMUNICATION MANAGEMENT METHOD, AND MEDIUM

TECHNICAL FIELD

The following disclosure relates to a communication terminal, a communication system, a communication management method, and medium.

BACKGROUND ART

In recent years, in accordance with, for example, a demand for reducing travel cost and time, a communication system which provides calling and conferencing over a communication network such as the Internet or a dedicated line or the like has become popular. In this kind of communication system, when a communication between communication terminals is started, content data such as image data and audio data are sent and received, and a video-conference, a phone call, or the like can be realized.

Further, in such a communication system used for video-conferences, multiple destinations can be registered so that a user can select one of these destinations to start a conference with a desired partner (see PTL 1).

Further, a method has been known in which a communication terminal makes a request for starting communication with a call center, to a management system (see PTL 2). The management system calls a destination communication terminal among communication terminals at the call center, and establishes a session between the communication terminal being the source of the start request, and the communication terminal being the destination.

SUMMARY

Technical Problem

However, while using a communication system in which groups of destinations on a network are managed, and any one of the groups can be specified as a destination, if a group needs to be changed, added, or deleted, it is necessary to update the system on the network. Updating the system on the network causes a problem such that load of maintenance increases, for example, operations of communication terminals need to be stopped for a certain period, operations of the system need to be evaluated without influencing working communication terminals, and so on.

Solution to Problem

According to an embodiment, a communication terminal includes a selection reception unit configured to receive selection of a group including destination information that represents destination candidates of communication; a determination unit configured to determine a destination among the destination candidates represented by the destination information included in the selected group; and a start request unit configured to make a request for starting communication with the determined destination.

Advantageous Effects of Invention

According to the disclosure, an embodiment has an effect that in a communication system in which a group can be specified as a destination, load of maintenance of the communication system, for example, when changing the configuration of a group, can be decreased.

BRIEF DESCRIPTION OF DRAWINGS

FIG. 1 is a schematic diagram of a communication system according to an embodiment;

FIG. 2 is an external view of a terminal according to an embodiment;

FIG. 3 is a hardware configuration diagram of a terminal according to an embodiment;

FIG. 4 is a hardware configuration diagram of a management system, a relay apparatus, a program providing system, or a maintenance system according to an embodiment;

FIG. 5 is a software configuration diagram of a terminal according to an embodiment;

FIG. 6 is a functional block diagram of a terminal and a management system constituting a part of a communication system according to an embodiment;

FIG. 7A is a schematic view of a table managed by a terminal or a management system;

FIG. 7B-1 is a schematic view of a table managed by a terminal or a management system;

FIG. 7B-2 is a schematic view of a table managed by a terminal or a management system;

FIG. 7B-3 is a schematic view of a table managed by a terminal or a management system;

FIG. 8 is a sequence chart that illustrates a process starting with activating a terminal, and terminating with obtaining a destination list;

FIG. 9A is a diagram that illustrates a display example on a display;

FIG. 9B is a diagram that illustrates a display example on a display;

FIG. 9C is a diagram that illustrates a display example on a display;

FIG. 10 is a sequence chart that illustrates a process of requesting for starting communication;

FIG. 11 is a flowchart that illustrates a process of generating a hierarchical destination list table;

FIG. 12 is a flowchart that illustrates a process of determining a destination;

FIG. 13 is a software configuration diagram of a terminal;

FIG. 14A is a flowchart that illustrates a process of registering a destination;

FIG. 14B is a flowchart that illustrates a process of generating a hierarchical destination list table;

FIG. 15A is a diagram that illustrates a display example on a display;

FIG. 15B is a diagram that illustrates a display example on a display; and

FIG. 16 is a flowchart that illustrates a process of submitting a registration application of a destination candidate.

DESCRIPTION OF EMBODIMENTS

In the following, referring to the drawings, an embodiment of the present invention will be described in detail. It should be noted that in the following, "communication terminal" may be simply described as "terminal", and "communication management system" may be simply described as "management system".

<<Overall Configuration of Communication System 1>>

FIG. 1 is a schematic diagram of a communication system 1 according to an embodiment of the present invention. As shown in FIG. 1, the communication system 1 includes a plurality of terminals (10aa, 10ab, . . . ), displays (120aa, 120*ab*, . . . ) for the terminals (10*aa*, 10*ab*, . . . ), a plurality of relay apparatuses (30*a*, 30*b*, 30*c*, 30*d*, 30*e*), a management system 50, a program providing system 90, and a maintenance system 100. A video conference or the like between remote places can be realized by having communication of image data or audio data as an example of content data performed by the communication system 1. It should be noted that a plurality of routers (70*a*, 70*b*, 70*c*, 70*d*, 70*ab*) select an optimal route of the content data.

The terminals (10*aa*, 10*ab*, 10*ac*, . . . ), the relay apparatus 30*a*, and the router 70*a* are connected to each other and are capable of communicating with each other via a LAN 2*a*. The terminals (10*ba*, 10*bb*, 10*bc*, . . . ), the relay apparatus 30*b*, and the router 70*b* are connected to each other and are capable of communicating with each other via a LAN 2*b*. Further, the LAN 2*a* and the LAN 2*b* are connected to each other and are capable of communicating with each other by a dedicated line 2*ab* including the router 70*ab*. Further, the LAN 2*a*, the LAN 2*b*, and the dedicated line 2*ab* are provided in a predetermined area X. It should be noted that the devices are not necessarily connected to each other by the dedicated line, but may be directly connected to the Internet 2*i*.

The terminals (10*ca*, 10*cb*, 10*cc*, . . . ), the relay apparatus 30*c*, and the router 70*c* are connected to each other and are capable of communicating with each other via a LAN 2*c*. The LAN 2*c* is provided in a predetermined area Y.

The terminals (10*da*, 10*db*, 10*dc*, . . . ), the relay apparatus 30*d*, and the router 70*d* are connected to each other and are capable of communicating with each other via a LAN 2*d*. The LAN 2*d* is provided in a predetermined area Z. The area X, the area Y, and the area Z may be located in the same country or in different countries.

The area X, the area Y, and the area Z are connected to each other and are capable of communicating with each other via the Internet 2*i* through respective routers (70*ab*, 70*c*, 70*d*). It should be noted that a call center is located in the area Z. The terminals 10 can receive a reception service by connecting to the terminals (10*da*, 10*db*, 10*dc*, . . . ) in the call center.

It should be noted that in the following, an arbitrary terminal of the terminals (10*aa*, 10*ab*, . . . ) is described as a "terminal 10", an arbitrary display of the displays (120*aa*, 120*ab*, . . . ) is described as a "display 120", and an arbitrary relay apparatus of the relay apparatuses (30*a*, 30*b*, 30*c*, 30*d*, 30*e*) is described as a "relay apparatus 30". Further, an arbitrary router of the routers (70*a*, 70*b*, 70*c*, 70*d*, 70*ab*) is described as a "router 70".

Further, the management system 50, the program providing system 90, and the maintenance system 100 are connected to the Internet 2*i*. It should be noted that the management system 50, the program providing system 90, and the maintenance system 100 may be located in the areas (X, Y, Z), or may be located in an area other than these areas.

Further, a communication network 2 in the present embodiment includes the LANs (2*a*, 2*b*, 2*c*, 2*d*), the dedicated line 2*ab*, the Internet 2*i*, LAN 2*c*, and the LAN 2*d*. In the communication network 2, there may be an area in which not only wired communication is performed, but also wireless communication such as communication via WiFi (Wireless Fidelity), Bluetooth (registered trade mark), a mobile telephone network or the like is performed.

Further, in FIG. 1, a set of four numbers shown under each terminal 10, each relay apparatus 30, the management system 50, each router 70, the program providing system 90, or the maintenance system 100 illustrates a typical IP address of IPv4 in a simplified manner. Further, instead of IPv4, IPv6 may be used. However, for the sake of simplicity, IPv4 is used in the description.

Further, in each terminal 10, when an application, which will be described later, is started, communications between users become available by sending and receiving content data including audio data or image data. Furthermore, the terminal 10 sends and receives call data by using a predetermined communication method (a call control method for connecting or disconnecting with a destination, and a coding method for IP packetizing the call data). It should be noted that in the following, "application" may be abbreviated as "appli" for short.

Further, as the call control method described above, (1) SIP (Session Initiation Protocol), (2) H.323, (3) enhanced SIP protocol, (4) protocol for instant messenger, (5) protocol utilizing a MESSAGE method of SIP, (6) protocol of Internet Relay Chat (IRC), (7) protocol enhanced from a protocol for instant messenger, or the like, can be listed. The above (4) protocol for instant messenger is a protocol used for, for example, (4-1) Extensible Messaging and Presence Protocol (XMPP), (4-2) ICQ (registered trademark), AIM (registered trademark), or Skype (registered trademark). Further, the above (7) Jingle, for example, is a protocol enhanced from the protocol for instant messenger.

<<Hardware Configuration of the Embodiment>>

Next, a hardware configuration of the present embodiment will be described. FIG. 2 is an external view of a terminal 10 according to an embodiment. As shown in FIG. 2, the terminal 10 includes a housing 1100, an arm 1200, and a camera housing 1300. In a front wall 1120 of the housing 1100, there is an air intake surface 1121 formed with a plurality of air intake holes, and, in a rear wall 1110 of the housing 1100, there is an air exhaust surface formed with a plurality of air exhaust holes. With the above arrangement, by driving a cooling fan embedded in the housing 1100, it becomes possible to take in air in front of the terminal 10 through the air intake surface 1121, and to exhaust the air to the rear of the terminal 10 through the air exhaust surface. Through a sound pickup hole 1131 formed on a right side wall 1130 of the housing 1100, a built-in mike 114, which will be described later, can pick up sound such as voice, sound, noise, etc.

In the right wall 1130 side of the housing 1100, an operation panel 1150 is formed. In the operation panel 1150, there are a plurality of operation buttons (108*a* through 108*e*), a power supply switch 109, and an alarm lamp 119, which will be described later. Further, a sound output surface 1151 is formed in the operation panel 1150, which is formed by a plurality of sound output holes used for passing output sound from a built-in speaker 115, which will be described later. Further, on a part of the housing 1100 close to the left wall 1140, a housing unit 1160 is formed as a concave portion for housing the arm 1200 and the camera housing 1300. On the right wall 1130 of the housing 1100, a plurality of connection ports (1132*a* through 1132*c*) are formed for electrically connecting cables for an external device connection I/F 118, which will be described later. On the other hand, on the left wall 1140 of the housing 1100, a connection port is formed for electrically connecting a cable 120*c* of a display 120 for a display I/F 117.

It should be noted that in the following, an arbitrary operation button of the operation buttons (108*a* through 108*e*) will be described as an "operation button 108", and an arbitrary connection port of the connection ports (1132*a* through 1132*c*) will be described as a "connection port 1132".

Next, the arm 1200 is attached to the housing 1100 via a torque hinge 1210, and is capable of rotating in an up-and-down direction within a range of tilt angle θ1 of 135 degrees with respect to the housing 1100. FIG. 2 illustrates a state in which the tilt angle is 90 degrees. In the camera housing 1300, there is a built-in camera 112, which will be described later, and is capable of taking images of a user, a document, a room, etc. Further, in the camera housing 1300, a torque hinge 1310 is formed. Further, the camera housing 1300 is attached to the arm 1200 via the torque hinge 1310. The camera housing 1300 is capable of rotating in a right-and-left direction within a range of +/−180 degrees of pan angle θ2, and rotating in an up-and-down direction within a range of +/−45 degrees of tilt angle θ3, with respect to the arm 1200, assuming that FIG. 2 illustrates a state in which 02 and 03 are zero degrees.

It should be noted that an external view of the terminal 10 is not limited to the view shown in FIG. 2, which is just an example. As another example, the terminal 10 may be a general-purpose computer, a mobile phone terminal, a projector, an electronic white board, digital signage, or the like (refer to the terminals (10*ac*, 10*cc*) in FIG. 1). When a computer used for the terminal 10 does not include a mike and a camera, an external mike and an external camera can be connected to the computer. Further, in the case where the terminal 10 is a general-purpose computer, a mobile telephone terminal, or the like, the terminal 10 may be connected to the Internet 2*i* through wireless communication utilizing a wireless LAN, a mobile telephone network, etc. Further, in the case where a general-purpose computer is used as a terminal 10, an application may be installed beforehand which causes the computer to perform processes of the terminal 10 which will be described later.

It should be noted that external views of the management system 50, the program providing system 90, and the maintenance system 100 are the same as an external view of a typical server computer, and thus, descriptions of the external views will be omitted.

FIG. 3 is a hardware configuration of a terminal 10 according to an embodiment. The terminal 10 includes a central processing unit (CPU) 101 for controlling overall operations of the terminal 10; a read only memory (ROM) 102 in which programs used for driving the CPU 101 such as an initial program loader are stored; a random access memory (RAM) 103 which is used for a work area of the CPU 101; a flash memory 104 in which programs for the terminal 10, and various kinds of data including image data, audio data, etc., are stored; a solid state drive (SSD) 105 which controls writing and reading the various data to and from the flash memory 104 according to the control of the CPU 101; a media I/F 107 which controls writing and reading data to and from a recording medium 106 including a flash memory, an integrated circuit (IC) card, etc.; the operation buttons 108 operated for, for example, selecting a destination of the terminal 10; the power supply switch 109 for switching ON/OFF the power supply of the terminal 10; and a network interface (I/F) 111 for performing data transmission by utilizing the communication network 2.

Further, the terminal 10 includes the built-in camera 112 which captures image data by taking an image of a subject according to the control of the CPU 101; an imaging element I/F 113 which controls driving the camera 112; the built-in mike 114 for inputting sound; a built-in speaker 115 for outputting sound; a sound input/output I/F 116 for processing input/output of an audio signal between the mike 114 and the speaker 115 according to the control of the CPU 101; the display I/F 117 for transmitting image data to the external display 120 according to the control of the CPU 101; the external device connection I/F 118 for connecting various external devices; the alarm lamp 119 for indicating an error of various functions of the terminal 10; and a bus line 110 such as an address bus, a data bus, etc., for electrically connecting the above elements as shown in FIG. 3.

The display 120 is a display unit used for displaying a subject image or the like. Examples of the display 120 include a liquid crystal and an organic electroluminescence (EL) panel. Further, the display 120 is connected to the display I/F 117 via the cable 120*c*. The cable 120*c* may be a cable for an analog RGB (VGA) signal, a cable for a component video, or a cable for a signal of High-Definition Multimedia Interface (HDMI) (registered trademark) or Digital Video Interactive (DVI).

The camera 112 includes a lens and a solid-state image sensing device to convert light into electric charge for computerizing the subject image, and as the solid-state image sensing device, a Complementary Metal Oxide Semiconductor (CMOS), a Charge Coupled Device (CCD), etc., are used.

To the external device connection I/F 118, via a Universal Serial Bus (USB) cable or the like, which is inserted into the connection port 1132 of the housing 1100, external devices such as an external camera, an external mike, and an external speaker can be electrically connected. In the case where the external camera is connected, according to the control of the CPU 101, priority is given to the external camera to be driven over the built-in camera 112. Similarly, in the case where an external mike is connected or an external speaker is connected, according to the control of the CPU 101, priority is given to the external mike or the external speaker over the built-in mike 114 or the built-in speaker 115, respectively.

It should be noted that the recording medium 106 can be easily attached or detached with the terminal 10. Further, as a non-volatile memory to/from which data are written/read under control of the CPU 101, an Electrically Erasable and Programmable ROM (EEPROM) may be used, not limited to the flash memory 104.

FIG. 4 is a hardware configuration diagram of a management system 50 according to an embodiment. The management system 50 includes a CPU 201 for controlling overall operations of the management system 50; a ROM 202 in which programs used for driving the CPU 201 such as an IPL are stored; a RAM 203 which is used for a work area of the CPU 201; a HD 204 for storing various data including programs for the management system 50, etc.; a hard disk drive (HDD) 205 for controlling various data reading and data writing of the HD 204 according to the control of the CPU 201; a medium I/F 207 for controlling data reading and data writing (storage) of a recording medium 206 including a flash memory; a display 208 for displaying various information items including a cursor, a menu, a window, a character, or an image; a network I/F 209 for performing data communications by using the communication network 2; a keyboard 211 including a plurality of keys for inputting characters, numerical values, various instructions, etc.; a mouse 212 for selecting and executing various instructions, selecting an object to be processed, moving the cursor, or the like; a compact disc read-only memory (CD-ROM) drive 214 for controlling various data reading of a CD-ROM 213 as an example of a detachable recording medium; and a bus line 210 such as an address bus, a data bus, etc., for electrically connecting the above elements as shown in FIG. 4.

On the other hand, the relay apparatus 30, the program providing system 90, and the maintenance system 100 have similar hardware configurations as the above management system 50, and thus, the descriptions will be omitted.

FIG. 5 is a software configuration of the terminal 10 according to an embodiment. As shown in FIG. 5, an OS 1020, a video conference application 1031, and a reception application 1032 are held in a work area 1010 of the RAM 103. The OS 1020 and these applications are installed in the terminal 10.

Further, the OS 1020 provides basic functions, and is basic software which controls the entire terminal 10. The video conference application 1031 is an application for connecting with another terminal 10 and performing a video conference. The reception application 1032 is an application for connecting with a terminal 10 of a call center, and communicating with an operator.

It should be noted that the above applications are just examples, and other applications may be installed. In the case where the other applications are installed, the other applications may be stored in the program providing system 90, and the other applications may be downloaded on demand from the terminal 10. Further, in the case where multiple video conference applications are installed, video conference applications using different protocols such as the above (1) through (7) may be installed.

<<Functional Configuration of Embodiment>>

Next, a functional configuration of the present embodiment will be described. FIG. 6 is a functional block diagram of a terminal 10 and the management system 50 included as a part of the communication system 1 according to the embodiment. It should be noted that in FIG. 6, the terminal 10 and the management 50 are connected to perform data communications via the communication network 2.

<Functional Configuration of Communication Terminal>

The terminal 10 includes a device control unit 1050 and a call control unit 1060. Among these, the device control unit 1050 is implemented by running the OS 1020. Further, the call control unit 1060 is implemented by activating an application for communication such as the video-conference application 1031 and the reception application 1032.

Further, the device control unit 1050 includes a sending and receiving unit 11, an operation input receiving unit 12, a display control unit 13, and a storing and reading unit 19. These units are functions realized by elements shown in FIG. 3 that operate by instructions from the CPU 101 which executes an activated application (program) read from the flash memory 104 and loaded on the RAM 103.

On the other hand, the call control unit 1060 includes a sending and receiving unit 21, an activation unit 22, a display control unit 24, a destination management unit 26, and a storing and reading unit 29. These units are functions realized by elements shown in FIG. 3 that operate by instructions from the CPU 101 which executes the video-conference application 1031 or the reception application 1032 (program) read from the flash memory 104 and loaded on the RAM 103.

Further, the terminal 10 includes a memory unit 1000 including the ROM 102, the RAM 103, and the flash memory 104 shown in FIG. 3. This memory unit 1000 includes a database (DB), which will be described later, (Login Information Management Table)

FIG. 7A is a schematic view that illustrates a login information management table. In the login information management table, narrowing information used for narrowing down a destination candidate of communication, a communication ID that is used when this narrowing information is selected, and a password used when making a login request to the management system 50 by using this communication ID, are associated with each other to be managed. The communication ID is information for identifying a communication destination in the communication system 1. The communication ID is not limited specifically, and may be identification information of a terminal 10, an account used when making a login request to the management system 50, or the like.

(Functional Configuration of Device Control Unit)

Next, a functional configuration of the device control unit 1050 in the terminal 10 will be described in detail. It should be noted that in the following, when the functional configuration of the device control unit 1050 in the terminal 10 is described, relations between functions and main elements among the elements shown in FIG. 3, which are used for realizing the functions of the device control unit 1050, will also be described.

The sending and receiving unit 11 is realized by instructions from the CPU 101 and the network I/F 111, and performs sending and receiving various data (or information) to and from a terminal, an apparatus, a system, etc., as communication counterparts, via the communication network 2.

The operation input receiving unit 12 is realized by instructions from the CPU 101, the operation buttons (108a, 108b, 108c, 108d, 108e) and the power supply switch 109, and accepts various inputs or various selections made by a user.

The display control unit 13 is realized by instructions from the CPU 101 and the display I/F 117, and controls displaying an image on the display 120.

The storing and reading unit 19 is realized by instructions from the CPU 101 and the SSD 105, or by instructions from the CPU 101, and performs a process of storing various data in the memory unit 1000 and reading the various data stored in the memory unit 1000.

(Functional Configuration of Call Control Unit)

Next, a functional configuration of the call control unit 1060 in the terminal 10 will be described in detail. It should be noted that in the following, when the functional configuration of the call control unit 1060 in the terminal 10 is described, relations between functions and main elements among the elements shown in FIG. 3, which are used for realizing the functions of the call control unit 1060 in the terminal 10, will also be described.

The sending and receiving unit 21 is realized by instructions from the CPU 101 and the network I/F 111, and performs sending and receiving various data (or information) to and from a terminal, an apparatus, a system, etc., as communication counterparts, via the communication network 2.

The activation unit 22 is realized by instructions from the CPU 101, and starts up operations of the call control unit 1060 (the video-conference application or the reception application), when the operation input receiving unit 12 receives selection of an application by the user.

The display control unit 24 is realized by instructions from the CPU 101 and the display I/F 117, and controls outputting screen data on the display 120.

The destination management unit 26 is realized by instructions from the CPU 101, and classifies communication IDs of destination candidates included in a destination list, into groups. Further, the destination management unit 26 determines a communication ID of a destination among the communication IDs included in the classified groups.

The storing and reading unit 29 is realized by instructions from the CPU 101 and the SSD 105 or by instructions from the CPU 101, and performs a process of storing various data in the memory unit 1000 and reading the various data stored in the memory unit 1000.

<Functional Configuration of Management System>

The management system 50 includes a sending and receiving unit 51, an authentication unit 52, a management unit 53, a session control unit 58, and a storing and reading unit 59. These units are functions realized by elements shown in FIG. 4 that operate by instructions from the CPU 201 which executes a program for the management system 50 read from the HD 204 and loaded on the RAM 203. Further, the management system 50 includes a memory unit 5000 including the HD 204. Furthermore, in the memory unit 5000, databases (DBs) including corresponding tables as described below are included.

(Authentication Management Table)

FIG. 7B-1 is a schematic view that illustrates an authentication management table. In the memory unit 5000, an authentication management DB 5001 including the authentication management table as shown in FIG. 7B-1 is included. In the authentication management table, for the communication ID of every terminal 10 managed by the management system 50, the communication ID is associated with a password for authentication, and stored to be managed.

(Terminal Management Table)

FIG. 7B-2 is a schematic view that illustrates a terminal management table. In the memory unit 5000, a terminal management DB 5002 including the terminal management table as shown in FIG. 7B-2 is included. In the terminal management table, for each communication ID, a destination name used when the terminal 10 is a destination, an operation state of the terminal 10, and an IP address of the terminal 10 are associated with the communication ID, to be managed. An operation state "OFFLINE" indicates a state in which the terminal 10 is not connected to the management system 50. An operation state "ONLINE (READY TO COMMUNICATE)" indicates a state in which the terminal 10 is connected to the management system 50, but not communicating with another terminal 10. An operation state "ONLINE (COMMUNICATING)" indicates a state in which the terminal 10 is connected to the management system 50, and communicating with another terminal 10.

(Destination List Management Table)

FIG. 7B-3 is a schematic view that illustrates a destination list management table. In the memory unit 5000, a destination list management DB 5004 including the destination list management table as shown in FIG. 7B-3 is included. In this destination list management table, each communication ID of the source of a start request that requests to start communication, is associated with communication IDs that can be specified as a destination candidate, to be managed.

<Functional Configuration of Management System>

Next, a functional configuration of the management system 50 will be described in detail. It should be noted that in the following, when the functional configuration of the management system 50 is described, relations between functions and main elements among the elements shown in FIG. 4, which are used for realizing the functions of the management system 50, will also be described.

The sending and receiving unit 51 is executed by instructions from the CPU 201 and the network I/F 209, and performs sending and receiving various data (or information) to and from a terminal, an apparatus, or a system via the communication network 2.

The authentication unit 52 is realized by instructions from the CPU 201, searches in the authentication management table by using the communication ID and password received by the sending and receiving unit 51 as a search key, and determines whether the same communication ID and password are managed in the authentication management table, to authenticate the terminal.

The management unit 53 is realized by instructions from the CPU 201, and performs a process of updating an operation state in the terminal management table (see FIG. 7B-2) in order to reflect the latest operation state.

The session control unit 58 controls a session for sending and receiving content data between the terminals 10, by instructions from the CPU 201. The control includes establishing a session, controlling the terminal 10 to participate in an established session, terminating a session, and the like.

The storing and reading unit 59 is executed by instructions from the CPU 201 and the HDD 205, or realized by instructions from the CPU 201, stores various data in the memory unit 5000, and extracts various data stored in the memory unit 5000.

<<Processes and Operations of Communication System 1>>

Next, processing methods of the communication system 1 will be described. First, using FIG. 8, a process will be described that starts with activating the terminal 10aa, and terminates with obtaining a destination list. FIG. 8 is a sequence chart that illustrates a process starting with activating the terminal 10aa, and terminating with obtaining a destination list.

First, when the user turns on the power source switch 109, the operation input receiving unit 12 receives the power-on operation, and activates the terminal 10aa (Step S1). After the terminal 10aa has been activated, in response to operational input by the user, the operation input receiving unit 12 receives a request for activating the reception application 1032. In response to the request for activation, the operation input receiving unit 12 issues a command to the activation unit 22, to activate the call control unit 1060 that corresponds to the reception application 1032 (Step S2). It should be noted that before this activation, a process has been executed by the device control unit 1050. Once the reception application 1032 has been activated, the process by the call control unit 1060 is executed.

Once the reception application 1032 has been activated, the display control unit 24 generates a login request reception screen as shown in FIG. 9A, and outputs the screen on the display 120aa. FIG. 9A is a display example on the display. As shown in FIG. 9A, the login request reception screen includes buttons (141a, 141b) to receive a login request. The display control unit 24 outputs narrowing information items, or "domestic travel" and "overseas travel" (Step S3), which are managed in the login information management table, on the buttons (141a, 141b). It should be noted that based on correspondence of information items in the login information management table, the buttons (141a, 141b) outputting the narrowing information items "domestic travel" and "overseas travel", are associated with the communications ID "01aa" and "02aa", and the passwords "aaaa" and "abcd", respectively.

If one of the buttons (141a, 141b) is selected by a user operation at the terminal 10aa, the operation input receiving unit 12 receives the login request (Step S4). Next, the sending and receiving unit 21 transmits the communication ID and password associated with the selected button to the management system 50, to makes a login request to the management system 50 (Step S5). For example, if selection is received on the button 141*a* outputting the narrowing information item "domestic travel", the communication ID "01aa" and the password "aaaa" associated with the button 141*a* are to be included in the login request.

By having the login request transmitted from the terminal 10*aa* to the management system 50, the management system 50 on the receiving side can obtain the IP address of the terminal 10*aa* on the sending side.

Next, the authentication unit 52 of the management system 50 searches in the authentication management table (see FIG. 7B-1) in the memory unit 5000, by using the communication ID and password included in the login request as a search key, and determines whether the same communication ID and password are managed in the authentication management table, for authentication (Step S6). If the login request is authenticated by the authentication unit 52 as a request that comes from a terminal 10 having valid use permission, the session management unit 53 associates the communication ID "01aa" of the terminal 10*aa* with the operation state "ONLINE (READY TO COMMUNICATE)" and the IP address of the terminal 10*aa*, and stores it in the terminal management table (see FIG. 7B-2) (Step S7).

Then, the sending and receiving unit 51 of the management system 50 transmits authentication result information that represents an authentication result obtained by the authentication unit 52, to the terminal 10*aa* being the source of the login request via the communication network 2 (Step S8). This makes the sending and receiving unit 11 of the terminal 10*aa* receive the authentication result information.

Once the terminal 10*aa* has been determined by the authentication unit 52 as a terminal having valid use permission, the sending and receiving unit 21 of the terminal 10*aa* makes a request for a destination list which indicates destination candidates that can be specified, to the management system 50 via the communication network 2 (Step S9). This request includes the communication ID of the source of the request for the destination list, namely, the communication ID used for making the login request. This makes the sending and receiving unit 51 of the management system 50 receive the request for the destination list.

Next, the storing and reading unit 59 of the management system 50 searches in the destination list management table (see FIG. 7B-3), by using the communication ID included in the request for the destination list as a search key, to read the communication IDs of the corresponding destination candidates (Step S10). For example, if the communication ID included in the request for the destination list is "01aa", the communication IDs "01da, 01db, . . . , 01dm, 01dn" of the corresponding destination candidates are read. Further, as a part of processing Step S10, the storing and reading unit 59 searches in the terminal management table (FIG. 7B-2) by using each of the communication IDs of the destination candidates that have been read as a search key, to read a corresponding destination name. For example, if the communication IDs of the destination candidates are "01da, 01db, . . . , 01dm, 01dn", destination names "HOKKAIDO TOHOKU 1, HOKKAIDO TOHOKU 2, . . . , KYUSHU OKINAWA 1, KYUSHU OKINAWA 2" are read.

Next, the sending and receiving unit 51 transmits destination list information in which the destination candidates are associated with the respective communications ID and destination names read out at Step S10, to the terminal 10*aa* being the source of the request for the destination list via the communication network 2 (Step S11). This makes the sending and receiving unit 21 of the terminal 10*aa* receive the destination list information. The storing and reading unit 29 of the terminal 10*aa* stores the destination list information transmitted from the management system 50 in the memory unit 1000.

When the operation states of the destination candidates in the terminal management table (FIG. 7B-2) are updated, the sending and receiving unit 51 of the management system 50 transmits the updated operation states that correspond to these destination candidates, to the terminal 10 being the source of the start request. In other words, if the operation states of the destination candidates identified by the communication IDs "01da, 01db, . . . , 01dm, 01dn" are updated, the updated operation states are sent to the terminal 10*aa* being the source of the start request, identified by the communication ID "01aa" (Step S12). Thus, the terminal 10*aa* can grasp latest operation states of the destination candidates.

Next, using FIG. 10, a process will be described that is executed after the terminal 10*aa* has obtained a destination list until a request for starting communication is made. FIG. 10 is a sequence chart that illustrates a process of requesting for starting communication. After having obtained the destination list information, the destination management unit 26 of the terminal 10*aa* analyzes the hierarchical structure of destination list information, to generate a hierarchical destination list table (Step S21).

Step S21 will be described in detail using FIG. 11. FIG. 11 is a flowchart that illustrates a process of generating a hierarchical destination list table. First, the destination management unit 26 obtains a destination name in the destination list information stored in the memory unit 1000 (Step S21-1).

The destination management unit 26 determines whether the obtained destination name is written in a predetermined rule (Step S21-2). In an embodiment, the predetermined rule may specify that a destination name is constituted with a combination of strings and digits. For example, if the obtained destination name is "HOKKAIDO TOHOKU 1", it is determined YES at Step S21-2; or if the name is "terminal BB", it is determined NO at Step S21-2.

If it is determined NO at Step S21-2, the destination management unit 26 determines that the obtained destination name is not to be included in the hierarchical destination list table (Step S21-3). Thus, the destination candidate having the obtained destination name is not included in the hierarchical destination list table, and hence, the destination candidate cannot be specified as a destination in a process by the reception application 1032, which is one of the communication applications, as will be described later. If it is determined NO at Step S21-2, the process on the terminal 10*aa* goes forward to Step S21-6.

If it is determined YES at Step S21-2, the destination management unit 26 executes syntactic analysis of the destination name based on the predetermined rule (Step S21-4). In this case, the destination management unit 26 identifies, for example, a string "HOKKAIDO TOHOKU" in the destination name "HOKKAIDO TOHOKU 1" as the first hierarchy, and then, identifies a combination of the string and a digit, "HOKKAIDO TOHOKU 1" as the second hierarchy.

Next, the destination management unit 26 associates the identified first hierarchy, the second hierarchy, and the communication ID of the destination candidate having this destination name with each other, and stores the association in the hierarchical destination list table included in the memory unit 1000 (Step S21-5).

Next, the destination management unit 26 determines whether every destination name in the destination list information stored in the memory unit 1000 has been obtained (Step S21-6). If it is determined NO at Step S21-6, the process on the terminal 10aa goes back to Step S21-1.

If it is determined YES at Step S21-6, the destination management unit 26 refers to the hierarchical destination list table, and if equivalent destination names exist in each hierarchy, unifies them as the same destination name (Step S21-7).

In an embodiment, every time the communication ID and the operation state of the destination candidate are transmitted (see Step S12), the destination management unit 26 of the terminal 10aa may associate a record in the hierarchical destination list table in which the transmitted communication ID is recorded, with the transmitted operation state of the destination candidate, to manage it (Step S21-8). Table 1 illustrates an example of the hierarchical destination list table.

TABLE 1

| FIRST HIERARCHY | SECOND HIERARCHY | COMMUNI-CATION ID | OPERATION STATE |
| --- | --- | --- | --- |
| HOKKAIDO • TOHOKU | HOKKAIDO • TOHOKU 1 | 01da | ONLINE (COMMUNICATING) |
|  | HOKKAIDO • TOHOKU 2 | 01db | ONLINE (READY TO COMMUNICATE) |
| ... | ... | ... | ... |
| KYUSHU • OKINAWA | KYUSHU • OKINAWA 1 | 01dx | ONLINE (READY TO COMMUNICATE) |
|  | KYUSHU • OKINAWA 2 | 01dy | ONLINE (READY TO COMMUNICATE) |

After having completed the hierarchical destination list table, the display control unit 24 generates a reception screen for destination selection that includes destination names at the first hierarchy in the hierarchical destination list table, and outputs it on the display 120aa (Step S22). FIG. 9B is a diagram that illustrates an example of the reception screen for destination selection. As shown in FIG. 9B, on the reception screen for destination selection, buttons (142a to 142O are output that designate destination names at the first hierarchy.

In response to a selection operation on one of the buttons (142a to 142O by the user on the reception screen for destination selection, the operation input receiving unit 12 receives selection of the destination at the first hierarchy (Step S23).

Next, the destination management unit 26 determines a destination candidate among the destination candidates at the second hierarchy that includes the destination names of the selected first hierarchy in the hierarchical destination list table, as the destination of communication (Step S24). Step S24 will be described in detail using FIG. 12. FIG. 12 is a flowchart that illustrates a process of determining a destination.

First, the destination management unit 26 refers to the operation state of each destination candidate at the second hierarchy that includes the destination name of the selected first hierarchy in the hierarchical destination list table (Step S24-1). For example, if the destination name "HOKKAIDO TOHOKU" is selected, the destination management unit 26 refers to the operation states of "ONLINE (COMMUNICATING)" and "ONLINE (READY TO COMMUNICATE)" of the destination names "HOKKAIDO TOHOKU 1" and "HOKKAIDO TOHOKU 2" of the destination candidates at the second hierarchy, respectively, that include the selected destination name "HOKKAIDO TOHOKU" at the first hierarchy (see Table 1).

Next, the destination management unit 26 determines whether a destination candidate having the operation state "ONLINE (READY TO COMMUNICATE)" is included among the operation states referred to at S24-1 (Step S24-2).

If it is determined NO at Step S24-2, the destination management unit 26 determines that no terminal 10 is available for connection now. In this case, the display control unit 24 outputs on the display 120aa a message that asks to wait for starting a call until one of the destination candidates transitions to the operation state "ONLINE (READY TO COMMUNICATE)" (Step S24-3).

If it is determined YES at Step S24-2, the destination management unit 26 determines whether there are multiple destination candidates having the operation state "ONLINE (READY TO COMMUNICATE)" (Step S24-4). For example, among the destination candidates having the destination names "HOKKAIDO TOHOKU 1" and "HOKKAIDO TOHOKU 2" at the second hierarchy, if only the operation state of the destination candidate having the destination name "HOKKAIDO TOHOKU 2" is "ONLINE (READY TO COMMUNICATE)", it is determined NO at Step S24-4.

If it is determined YES at Step S24-4, the destination management unit 26 determines a destination among the destination candidates having the operation state "ONLINE (READY TO COMMUNICATE)" (Step S24-5). As a method of determining a destination, one may consider, for example, a method that selects a destination name having the smallest digits included in the second hierarchy; a method that generates a uniform random number between 0 and 1 (rand), takes M=Ceil(rand×N) where Ceil( ) is the ceiling function, and selects the M-th destination candidate among N destination candidates; a method that selects a destination candidate having a least reception frequency of requests for starting communication; and the like, although the method is not specifically limited to these.

If it is determined NO at Step S24-4, the destination management unit 26 determines the destination candidate having the operation state "ONLINE (READY TO COMMUNICATE)" as the destination (Step S24-6).

In the following, description will continue assuming that the destination candidate having the destination name "HOKKAIDO TOHOKU 2" is determined as the destination. The display control unit 24 may output on the display 120aa a confirmation screen for connection that includes the destination name at the first hierarchy as shown in FIG. 9C. FIG. 9C is a diagram that illustrates an example of the confirmation screen. In response to receiving confirmation on this confirmation screen, the sending and receiving unit 21 transmits a request for starting communication with the determined destination to the management system 50 (Step S25). This start request includes the communication ID "01aa" of the source of the start request, and the communication ID "01db" of the destination having the determined destination name "HOKKAIDO TOHOKU 2".

In response to receiving the start request by the terminal 10aa at the sending and receiving unit 51 of the management system 50, the management unit 53 updates the operation states associated with the communication ID "01aa" being the source of the start request, and the communication ID "01db" being the destination in the terminal management table (see FIG. 7B-2) to "ONLINE (COMMUNICATING)" (Step S26).

Next, the session control unit 58 of the management system 50 controls establishing a session sed between the terminal 10aa being the source of the start request, and the terminal 10db that has made a login request by using the communication ID "01db" via the relay apparatus 30 (Step S27). Once the session sed has been established, the terminals (10aa, 10db) transmit image data and sound data via the relay apparatus 30 (Step S28). Thus, a call can be started between a customer on the terminal 10aa side and an operator on the terminal 10db side.

Modified Example A of Embodiment

Next, a modified example A of the embodiment will be described in terms of different points from the above embodiment. Table 2 illustrates a terminal management table that is managed in the management system 50.

TABLE 2

| COMMUNICATION ID | DESTINATION NAME | OPERATION STATE | IP ADDRESS OF TERMINAL |
|---|---|---|---|
| 01aa | BRANCH A, DOMESTIC TRAVEL | ONLINE (READY TO COMMUNICATE) | 1.2.1.3 |
| ... | ... | ... | ... |
| 02aa | BRANCH A, OVERSEAS TRAVEL | OFFLINE | |
| ... | ... | ... | ... |
| 01da | /HOKKAIDO • TOHOKU /HOKKAIDO • TOHOKU 1/ | ONLINE (COMMUNICATING) | 1.3.2.3 |
| 01db | /HOKKAIDO • TOHOKU /HOKKAIDO • TOHOKU 2/ | ONLINE (READY TO COMMUNICATE) | 1.3.2.4 |
| ... | ... | ... | ... |
| 01dm | /KYUSHU • OKINAWA /KYUSHU • OKINAWA 1/ | ONLINE (READY TO COMMUNICATE) | 1.3.2.••• |
| 01dn | /KYUSHU • OKINAWA /KYUSHU • OKINAWA 2/ | ONLINE (READY TO COMMUNICATE) | 1.3.2.••• |
| ... | ... | ... | ... |
| 01dx | /EUROPE /EUROPE 1/ | ONLINE (READY TO COMMUNICATE) | 1.3.2.••• |
| 01dy | /EUROPE /EUROPE 2/ | ONLINE (COMMUNICATING) | 1.3.2.••• |
| ... | ... | ... | ... |

In the modified example A, hierarchies in a destination name are separated by delimiters "/". In other words, in the modified example A, the predetermined rule is to separate hierarchies in a destination name by delimiters "/".

In the modified example A, substantially the same processes are executed as in the above embodiment except for the determination at Step S21 and syntactic analysis of a destination being replaced with the predetermined rule.

Modified Example B of Embodiment

Next, a modified example B of the embodiment will be described in terms of different points from the above embodiment. FIG. 13 is a software configuration diagram of a terminal 10. In the modified example B, a destination registration application 1033 is installed to register a sample of destinations on the terminal 10. It should be noted that the destination registration application 1033 has substantially the same functions as the reception application 1032 such as syntactic analysis. Therefore, the destination registration application 1033 may not be provided separate from the reception application 1032, but the reception application 1032 may be configured to implement a process described later.

If extracting only a desired destination candidate in a destination list managed in the management system 50 in the above embodiment, naming a destination name requires detailed rules, and complex conditions need to be considered. In contrast to this, in the modified example B, by registering a sample in the terminal 10, a destination candidate coincident with the sample can be easily extracted.

Using FIG. 14A, a process of registering a sample of a destination will be described. FIG. 14A is a flowchart that illustrates a process of registering a destination. The recording medium 106 such as a USB memory records a file of a sample of the hierarchical destination list table. This sample is generated, for example, in a CSV (character-separated values) format. After the destination registration application 1033 has been activated on the terminal 10, and the recording medium 106 is connected with the media I/F 107, the display control unit 24 generates a file selection screen that includes the filename of the sample stored in the recording medium 106, and outputs the screen on the display 120aa (Step S41). FIG. 15A is a diagram that illustrates an example of the file selection screen.

In response to an operation by the user on the file selection screen, the operation input receiving unit 12 receives selection of a file to be registered (Step S42). In each sample, only destination names at the first hierarchy in the above hierarchical destination list table are registered as in Table 3. Table 3 illustrates an example of a sample.

TABLE 3

| FIRST HIERARCHY | SECOND HIERARCHY | COMMUNICATION ID | OPERATION STATE |
|---|---|---|---|
| HOKKAIDO • TOHOKU | | | |
| ... | | | |
| KYUSHU • OKINAWA | | | |

The display control unit 24 displays a confirmation screen that includes destination names at the first hierarchy that are registered in the selected sample. FIG. 15B is an example of a confirmation screen when the sample in Table 3 is selected. It should be noted that if the sample is a CSV file, syntactic analysis may be executed, for example, by split( ) of JavaScript (trademark), to extract a string at the first hierarchy.

After having received the confirmation by an operation by the user on the confirmation screen, the storing and reading unit 29 records the selected sample in the memory unit 1000 as a registered sample (Step S43).

Using FIG. 14B, a process of generating a hierarchical destination list table at Step S21 in the modified example B will be described. FIG. 14B is a flowchart that illustrates a process of generating a hierarchical destination list table.

After having obtained the destination list information at Step S11, the destination management unit 26 obtains a destination name in the destination list information stored in the memory unit 1000 (Step S21-21).

The destination management unit 26 executes syntactic analysis of the obtained destination name, and determines whether a string at the first hierarchy in the sample is included in the destination name (Step S21-22).

If it is determined NO at Step S21-22, the destination management unit 26 determines not to include the obtained destination name in the hierarchy destination list (Step S21-23), and then, the process on the terminal 10aa goes forward to Step S21-25.

If it is determined YES at Step S21-22, the destination management unit 26 stores the obtained destination name in the second hierarchy lower to the first hierarchy including the same string as that obtained (Step S21-24). For example, if the obtained destination name from the destination list information is "HOKKAIDO TOHOKU 1", the destination management unit 26 stores "HOKKAIDO TOHOKU 1" in the second hierarchy lower to "HOKKAIDO TOHOKU" which is the destination name at the first hierarchy in the sample of Table 3. The destination management unit 26 further stores the communication ID of the destination of the destination name with the stored destination name.

Next, the destination management unit 26 determines whether every destination name in the destination list information stored in the memory unit 1000 has been obtained (Step S21-25). If it is determined NO at Step S21-25, the process on the terminal 10aa goes back to Step S21-21.

It is determined YES at Step S21-25, the hierarchical destination list table is completed that stores destination names in the second hierarchy in the sample.

Modified Example C of Embodiment

Next, a modified example C of the embodiment will be described in terms of different points from the above modified example B. In the modified example C, after having registered a sample as in the modified example B, a registration application of a destination candidate having the destination name coincident with the sample, can be submitted to the management system 50.

Using FIG. 16, a process of submitting a registration application of a destination candidate to the management system 50 will be described. FIG. 16 is a flowchart that illustrates a process of submitting a registration application of a destination candidate. First, the operation input receiving unit 12 receives selection among the communication IDs "01aa" and "02aa" that are managed in the login information management table and usable on the terminal itself, for which the registration application of the destination candidate will be submitted, as the request source (Step S61).

Next, the operation input receiving unit 12 receives input of the communication ID and destination name of the destination candidate for the registration application (Step S62).

Next, the destination management unit 26 executes syntactic analysis of the input destination name. Then, the destination management unit 26 determines whether the input destination name includes one of the strings at the first hierarchy in the sample registered at Step S43, for example, "HOKKAIDO TOHOKU", "KYUSHU OKINAWA", and so on (Step S63).

If it is determined NO at Step S63, the operation input receiving unit 12 determines that a registration application cannot be submitted because the input destination name is not included in the sample (Step S64). In this case, the process on the terminal 10aa goes forward to Step S66.

If it is determined YES at Step S63, the operation input receiving unit 12 determines to submit the registration application of the input destination name. Then, the storing and reading unit 29 stores the string at the first hierarchy included in the input destination name, the input destination name, and the communication ID of the input destination candidate, in a registered hierarchical destination list table used for registration application included in the memory unit 1000 (Step S65).

Next, the operation input receiving unit 12 receives input of selection about whether there is another destination candidate for which a registration application will be submitted. If there is another destination candidate for registration application (YES at Step S66), the process on the terminal 10aa goes back to Step S62.

If there is no destination candidate for registration application (NO at Step S66), the sending and receiving unit 21 transmits the communication ID of the source of the request input at Step S61, and registration application information including the registered hierarchical destination list table stored in the memory unit 1000 to the management system 50. Table 4 illustrates an example of the registered hierarchical destination list table (Step S67).

TABLE 4

| FIRST HIERARCHY | SECOND HIERARCHY | COMMUNICATION ID |
| --- | --- | --- |
| HOKKAIDO • TOHOKU | HOKKAIDO • TOHOKU 3 | 01dc |
| KYUSHU • OKINAWA | KYUSHU • OKINAWA 3 | 01do |

The sending and receiving unit 51 of the management system 50 receives the registration application information. The management unit 53 of the management system 50 associates the communication ID of the source of the request included in the registration application information, with the communication ID of the destination candidate included in the registered hierarchical destination list table in the registration application information, and registers it in the destination list management table. Table 5 illustrates an example of an updated destination list management table. Once the destination list management table is updated, the request source can specify the destination candidate of the registration application as a destination of communication.

TABLE 5

| COMMUNICATION ID OF SOURCE OF START REQUEST | COMMUNICATION ID OF DESTINATION |
|---|---|
| 01aa | 01da,01db,01dc, ···01dm,01dn,01do |
| 02aa | 01dx,01dy, ··· |
| ··· | ··· |

Further, the management unit 53 of the management system 50 associates the communication ID and the destination name included in the registered hierarchical destination list table in registration application information, and registers them in the terminal management table. Table 6 illustrates an example of an update terminal management table.

TABLE 6

| COMMUNICATION ID | DESTINATION NAME | OPERATION STATE | IP ADDRESS OF TERMINAL |
|---|---|---|---|
| 01aa | BRANCH A, DOMESTIC TRAVEL | ONLINE (READY TO COMMUNICATE) | 1.2.1.3 |
| ··· | ··· | ··· | ··· |
| 02aa | BRANCH A, OVERSEAS TRAVEL | OFFLINE | |
| ··· | ··· | ··· | ··· |
| 01da | HOKKAIDO · TOHOKU 1 | ONLINE (COMMUNICATING) | 1.3.2.3 |
| 01db | HOKKAIDO · TOHOKU 2 | ONLINE (READY TO COMMUNICATE) | 1.3.2.4 |
| 01dc | HOKKAIDO · TOHOKU 3 | | |
| ··· | ··· | ··· | ··· |
| 01dm | KYUSHU · OKINAWA 1 | ONLINE (READY TO COMMUNICATE) | 1.3.2.··· |
| 01dn | KYUSHU · OKINAWA 2 | ONLINE (READY TO COMMUNICATE) | 1.3.2.··· |
| 01do | KYUSHU · OKINAWA 3 | | |
| ··· | ··· | ··· | ··· |
| 01dx | EUROPE 1 | ONLINE (READY TO COMMUNICATE) | 1.3.2.··· |
| 01dy | EUROPE 2 | ONLINE (COMMUNICATING) | 1.3.2.··· |
| ··· | ··· | ··· | ··· |

Effect of Embodiment

According to the communication management method in the above embodiment, the destination management unit 62 of the terminal 10 (an example of a classification unit) classifies destination names in destination list information that represent destination candidates (an example of destination information) into groups (an example of classifying). The operation input receiving unit 12 of the terminal 10 (an example of a selection reception unit) receives selection of a destination group among the groups classified by the destination management unit 62 (an example of receiving selection). The destination management unit 62 of the terminal 10 (an example of a determination unit) selects a destination name among one or more destination names classified into the group of the selected destination, to determine the destination (an example of determining). The sending and receiving unit 21 of the terminal 10 (an example of start request unit) makes a request for starting communication with the destination determined by the management system 50 (an example of making a request for starting). As described above, according to the above process, when destination candidates are updated, the updated destination candidates can be classified into groups automatically on the terminal 10 side. Further, by transmitting a destination determined in a group on the terminal 10 side, group management is not required on the management system 50 side, and load of maintenance due to updating a group can be reduced.

The management system 50 manages destination list information that can be provided for each communication ID (an example of an account). The sending and receiving unit 21 of the terminal 10 (an example of a login request unit) transmits a login request to the management system 50 (an example of making a login request). The operation input receiving unit 12 of the terminal 10 receives selection among narrowing information items "domestic travel" and "overseas travel" managed in the login information management table as narrowing information for narrowing down destination candidates. The sending and receiving unit 21 makes a login request to the management system 50 by a communication ID associated with the selected narrowing information item in the login information management table. Thus, the terminal 10 can change destination list information to obtain at the login, depending on the selected narrowing information.

The above destination name has a hierarchical structure. The destination management unit 62 classifies destination names, based on commonality at the first hierarchy of the destination names. According to this method, destination names can be easily classified on the terminal 10 side.

A sample of a hierarchical destination list table registered in the memory unit 1000 (an example of a management unit) manages strings at the first hierarchy (an example of a predetermined hierarchy) of destination names (an example of hierarchy information). The destination management unit 62 (an example of registration reception unit) receives a registration application of a destination if the destination name includes a string at the first hierarchy in the sample. Thus, the terminal 10 can submit an application to register a destination that can be classified by a sample as destination list information.

The destination management unit 62 classifies destination names included in the destination list information that include strings in the sample. Thus, only desired destination names can be extracted among the destination names included in the destination list information.

The management system 50 manages, for each destination candidate that can be specified as a destination of communication, state information that represents a state of the destination candidate. The sending and receiving unit 21 of the terminal 10 (an example of obtainment unit) receives and obtains the state information from the management system 50. The destination management unit 62 determines a destination based on the state information of a destination candidate among destination candidates having destination names classified in a group of a selected destination. Thus, the terminal 10 can determine a destination candidate in a state ready to communicate as a destination.

Supplementary Description of Embodiments

It should be noted that the management system 50 and the program providing system 90 in the above embodiments may be constituted with a single computer, or constituted with multiple computers to which corresponding units (functions or means) are arbitrarily partitioned and assigned. Further, if the program providing system 90 is constituted with a single computer, a program transmitted by the program providing system 90 may be transmitted by partitioning the program into multiple modules, or may be transmitted without partitioning. Furthermore, if the program providing system 90 is constituted with multiple computers, a program may be transmitted from the computers in a state where the program is partitioned into multiple modules.

Further, a recording medium in which a terminal program, a relay apparatus program, and a communication management program of the communication system 1 are stored, an HD 204 in which the above programs are stored, and the program providing system 90 including the HD 204 can be provided as program products for domestic or overseas users of the terminal program, the relay apparatus program, and the communication management program.

Furthermore, although in the communication system 1, the IP address of a terminal is managed in the terminal management table shown in FIG. 7B, it is not limited to that, but respective FQDNs (Fully Qualified Domain Names) may be managed as long as they are terminal identification information to identify the respective terminals 10 on the communication network 2. In this case, the IP address corresponding to a FQDN is obtained by a known DNS (Domain Name System) server.

In the communication system 1, the "video conference" is used as a term which can be replaced by "TV conference".

Further, in the above communication system 1, as an example of the communication system 1, a case of a video conference system has been described, but it is not limited to that, but may be a car navigation system. In this case, for example, one terminal 10 corresponds to a car navigation device installed in an automobile, and another terminal 10 corresponds to a management terminal or a management server in a management center that manages car navigation, or a car navigation device that is installed on another automobile.

Furthermore, the communication system 1 may be an audio conference system or a personal computer (PC) screen sharing system. Further, the communication system 1 may be a communication system for Internet protocol (IP) telephones, Internet telephones, or mobile telephones. In the above cases, for example, the terminal 10 corresponds to a telephone such as a mobile telephone terminal.

Further, content data may be sound data generated in a body such as pulse sound or heartbeats, image data that represents a waveform of an electrocardiogram or change of the body temperature, or coordinates data that represents information in the body. Thus, the communication system 1 of the embodiment can be used as a remote medical system.

Further, although image data and sound data have been described as examples of content data in the above embodiment, it is not limited to that, but may be tactile sensation (touch) data. In this case, sensation of touch by a user on one terminal side is transferred to the other terminal side. Furthermore, content data may be olfactory sensation (smell) data. In this case, sensation of smell on one terminal side is transferred to the other terminal side. Further, content data may be at least one of data items among image data, sound data, tactile sensation data, and olfactory sensation data.

It should be noted that the terminals 10 may be used not only for a call between multiple offices, and a call between different rooms in the same office, but also for a call in the same room, and a call between the outdoors and indoors or between the outdoors and outdoors. If the terminals 10 are used outdoors, wireless communication may be executed through a cellular phone communication network or the like. Further, although a case of a video-conference by the communication system 1 has been described in the above embodiment, but it is not limited to that; the communication system may be used for a meeting, ordinary conversation between family members of friends, or presentation of information in one direction.

Further, the present invention is not limited to these embodiments and examples described above, but various variations and modifications may be made without departing from the scope of the present invention.

The present application is based on and claims the benefit of priority of Japanese Priority Application No. 2015-149155 filed on Jul. 29, 2015, with the Japanese Patent Office, the entire contents of which are hereby incorporated by reference.

CITATION LIST

Patent Literature

PTL 1: Japanese Laid-open Patent Publication No. 2012-191598

PTL 2: Japanese Laid-open Patent Publication No. 2014-200063

REFERENCE SIGNS LIST

10 terminal
11 sending and receiving unit
12 operation input accepting unit
13 display control unit
19 storing and reading unit
21 sending and receiving unit
22 activation unit
24 display control unit
26 destination management unit
29 storing and reading unit
30 relay apparatus
50 management system
51 sending and receiving unit
52 authentication unit
53 management unit
58 session control unit
59 storing and reading unit 1000 memory unit
1001 login information management DB
5000 memory unit
5001 authentication management DB
5002 terminal management DB
5004 destination list management DB

The invention claimed is:

1. A communication terminal configured to communicate with a management system via a network, the communication terminal comprising:
processing circuitry configured to
receive, as a reply to a request for a destination list, the request including a communication ID of a source of the request and being transmitted to the management system, destination list information in which destination candidates are associated with respective communication IDs and destination names that correspond to the communication ID of the source of the request;
classify the destination candidates included in the received destination list information into a plurality of groups;
receive selection of a group from among the plurality of classified groups;
determine a particular destination from among destination candidates represented by particular destination information included in the selected group; and
make a request for starting communication with the determined particular destination.

2. The communication terminal of claim 1, wherein the processing circuiting is further configured to:
make a login request to the management system managing the destination information that can be provided for each of a plurality of accounts,
receive selection of narrowing information for narrowing down the destination candidates, and
make the login request to the management system by a particular account that corresponds to the selected narrowing information.

3. The communication terminal as claimed in claim 1, wherein the particular destination information has a hierarchical structure, and
the processing circuitry is further configured to classify the particular destination information based on commonality at a hierarchical level.

4. The communication terminal as claimed in claim 3, wherein the processing circuitry is further configured to
manage hierarchy information that represents a predetermined hierarchy in the particular destination information; and
receive a registration of the particular destination information that includes the managed hierarchy information.

5. The communication terminal as claimed in claim 4, wherein the processing circuitry is further configured to classify the particular destination information that includes the managed hierarchy information included in the particular destination information representing the destination candidates.

6. The communication terminal as claimed in claim 1, wherein the processing circuitry is further configured to
obtain state information representing states of the destination candidates, and
determine the particular destination based on the state information of the destination candidates represented by the particular destination information included in the selected group.

7. A communication system, comprising:
one or more of the communication terminals as claimed in claim 3; and
the management system.

8. A communication management method, executed by a communication terminal configured to communicate with a management system via a network, the method comprising:
receiving, as a reply to a request for a destination list, the request including a communication ID of a source of the request and being transmitted to the management system, destination list information in which destination candidates are associated with respective communication IDs and destination names that correspond to the communication ID of the source of the request;
classifying the destination candidates included in the received destination list information into a plurality of groups;
receiving selection of a group from among the plurality of classified groups;
determining a particular destination from among destination candidates represented by particular destination information included in the selected group; and
making a request for starting communication with the determined particular destination.

9. The communication management method as claimed in claim 8, executed by the communication terminal, the method further comprising:
receiving selection of narrowing information for narrowing down the destination candidates; and
making a login request to the management system, by a particular account that corresponds to the selected narrowing information,
wherein the management system manages the destination information that can be provided for each of a plurality of accounts, and transmits the destination information that corresponds to the particular account being a source of the login request, to the communication terminal.

10. A non-transitory computer-readable recording medium including a program stored therein for causing a communication terminal, configured to communicate with a management system via a network, to execute a process, the process comprising:
receiving, as a reply to a request for a destination list, the request including a communication ID of a source of the request and being transmitted to the management system, destination list information in which destination candidates are associated with respective communication IDs and destination names that correspond to the communication ID of the source of the request;
classifying the destination candidates including in the received destination list information into a plurality of groups;
receiving selection of a group from among the plurality of classified groups;
determining a particular destination from among destination candidates represented by particular destination information included in the selected group; and
making a request for starting communication with the determined particular destination.

11. The method of claim 9, wherein the login request includes identification of the particular account, an address of the communication terminal, and authentication information.

* * * * *